United States Patent
Fong et al.

(10) Patent No.: US 11,466,386 B2
(45) Date of Patent: Oct. 11, 2022

(54) SPINNERETS AND SPINNERET ARRAYS FOR ELECTROSPINNING AND ELECTROSPINNING MACHINES

(71) Applicant: NANOPAREIL, LLC, Dakota Dunes, SD (US)

(72) Inventors: Hao Fong, Dakota Dunes, SD (US); Todd J. Menkhaus, Dakota Dunes, SD (US); Yong Zhao, Dakota Dunes, SD (US); Nyle Hedin, Dakota Dunes, SD (US); Craig Arnold, Dakota Dunes, SD (US)

(73) Assignee: Nanopareil, LLC, Dakota Dunes, SD (US)

( * ) Notice: Subject to any disclaimer, the term of this patent is extended or adjusted under 35 U.S.C. 154(b) by 346 days.

(21) Appl. No.: 16/438,821

(22) Filed: Jun. 12, 2019

(65) Prior Publication Data

US 2019/0292685 A1    Sep. 26, 2019

Related U.S. Application Data

(63) Continuation of application No. PCT/US2017/065741, filed on Dec. 12, 2017.
(Continued)

(51) Int. Cl.
*D01D 7/00* (2006.01)
*D01D 5/00* (2006.01)
(Continued)

(52) U.S. Cl.
CPC .......... *D01D 5/0069* (2013.01); *B29C 48/05* (2019.02); *B29C 48/142* (2019.02); *B29C 48/30* (2019.02);
(Continued)

(58) Field of Classification Search
CPC ....... B29C 48/05; B29C 48/142; B29C 48/30; D01D 4/02; D01D 5/0061; D01D 5/0069; D01D 5/0038; D01D 7/00
(Continued)

(56) References Cited

U.S. PATENT DOCUMENTS

| 6,420,024 B1 | 7/2002 | Perez et al. |
| 7,261,817 B2 | 8/2007 | Requate et al. |

(Continued)

FOREIGN PATENT DOCUMENTS

| EP | 1217107 A1 | 6/2002 |
| WO | 2005090653 A1 | 9/2005 |

(Continued)

OTHER PUBLICATIONS

Nanopareil, LLC, PCT/US2017/065741 filed Dec. 12, 2017, "The International Search Report and the Written Opinion of the International Searching Authority, or the Declaration", 13 pages, dated Apr. 8, 2018.
(Continued)

*Primary Examiner* — Leo B Tentoni
(74) *Attorney, Agent, or Firm* — McKee, Voorhees & Sease, PLC

(57) ABSTRACT

This disclosure relates to air-assisted spinnerets and spinneret arrays for electrospinning. In some embodiments, the air-assisted spinnerets and spinneret arrays are incorporated in electrospinning systems and/or electrospinning machines. Methods of making and using the same are also described herein.

18 Claims, 18 Drawing Sheets

Related U.S. Application Data

(60) Provisional application No. 62/433,061, filed on Dec. 12, 2016.

(51) Int. Cl.

| | | |
|---|---|---|
| *D01D 4/02* | (2006.01) | |
| *D01D 4/06* | (2006.01) | |
| *D04H 1/728* | (2012.01) | |
| *B29C 48/30* | (2019.01) | |
| *B29C 48/05* | (2019.01) | |
| *B29C 48/14* | (2019.01) | |
| *D01F 6/94* | (2006.01) | |
| *D01F 6/18* | (2006.01) | |

(52) U.S. Cl.
CPC ............... *D01D 4/02* (2013.01); *D01D 4/06* (2013.01); *D01D 5/0007* (2013.01); *D01D 5/0038* (2013.01); *D04H 1/728* (2013.01); *D01F 6/18* (2013.01); *D01F 6/94* (2013.01); *D10B 2201/28* (2013.01); *D10B 2321/10* (2013.01); *D10B 2331/06* (2013.01)

(58) Field of Classification Search
USPC ..... 425/72.2, 174.8 E, 461; 264/211.12, 465
See application file for complete search history.

(56) References Cited

U.S. PATENT DOCUMENTS

| | | | |
|---|---|---|---|
| 8,003,364 | B2 | 8/2011 | Post Hansen et al. |
| 8,021,889 | B2 | 9/2011 | Boschetti et al. |
| 8,163,531 | B2 | 4/2012 | Post Hansen et al. |
| 8,403,151 | B2 | 3/2013 | Cheng et al. |
| 8,470,578 | B2 | 6/2013 | Post Hansen et al. |
| 8,945,389 | B2 | 2/2015 | Faber et al. |
| 9,074,077 | B2 | 7/2015 | Harada et al. |
| 9,109,201 | B2 | 8/2015 | Post Hansen et al. |
| 9,309,385 | B2 | 4/2016 | Umemoto et al. |
| 9,387,443 | B2 | 7/2016 | Faber |
| 9,433,904 | B2 | 9/2016 | Demmer et al. |
| 9,604,168 | B2 | 3/2017 | Menkhaus et al. |
| 9,623,352 | B2 | 4/2017 | Kas et al. |
| 10,252,199 | B2 | 4/2019 | Kas et al. |
| 10,315,133 | B2 | 6/2019 | Faber et al. |
| 10,415,031 | B2 | 9/2019 | Sinha |
| 10,517,973 | B2 | 12/2019 | Leuthold et al. |
| 2009/0189318 | A1* | 7/2009 | Kim .................. D01D 5/0061 264/465 |
| 2010/0173551 | A1* | 7/2010 | Elida ................. D01D 5/0038 264/465 X |
| 2013/0260419 | A1 | 10/2013 | Ransohoff et al. |
| 2014/0027938 | A1* | 1/2014 | Swatloski ............ D01D 5/003 264/10 |
| 2014/0291897 | A1 | 10/2014 | Westbroek et al. |
| 2015/0275399 | A1 | 10/2015 | Kodama |
| 2017/0016864 | A1 | 1/2017 | Gjoka et al. |
| 2018/0159139 | A1 | 6/2018 | Radacsi et al. |
| 2018/0243724 | A1 | 8/2018 | Villain et al. |
| 2019/0054397 | A1 | 2/2019 | Pflanz et al. |
| 2019/0105632 | A1 | 4/2019 | Kupracz et al. |
| 2019/0209732 | A1 | 7/2019 | Xie et al. |
| 2019/0314746 | A1 | 10/2019 | Leung |
| 2019/0343772 | A1 | 11/2019 | Barbe et al. |
| 2019/0358609 | A1 | 11/2019 | Ley et al. |
| 2019/0376210 | A1 | 12/2019 | Drakonakis et al. |
| 2019/0381457 | A1 | 12/2019 | Erdenberger |
| 2020/0171418 | A1 | 6/2020 | Rezaei et al. |
| 2020/0173076 | A1 | 6/2020 | Cataldo et al. |
| 2020/0179848 | A1 | 6/2020 | Higginson et al. |

FOREIGN PATENT DOCUMENTS

| | | | |
|---|---|---|---|
| WO | WO-2014079400 A1 * | 5/2014 | ............... D01D 5/00 |
| WO | 2019237149 A1 | 12/2019 | |

OTHER PUBLICATIONS

European Patent Office, in connection with 17881341.6 filed Dec. 12, 2017, "Extended European Search Report", for Nanopariel, LLC, 6 pages, dated May 13, 2020.

* cited by examiner

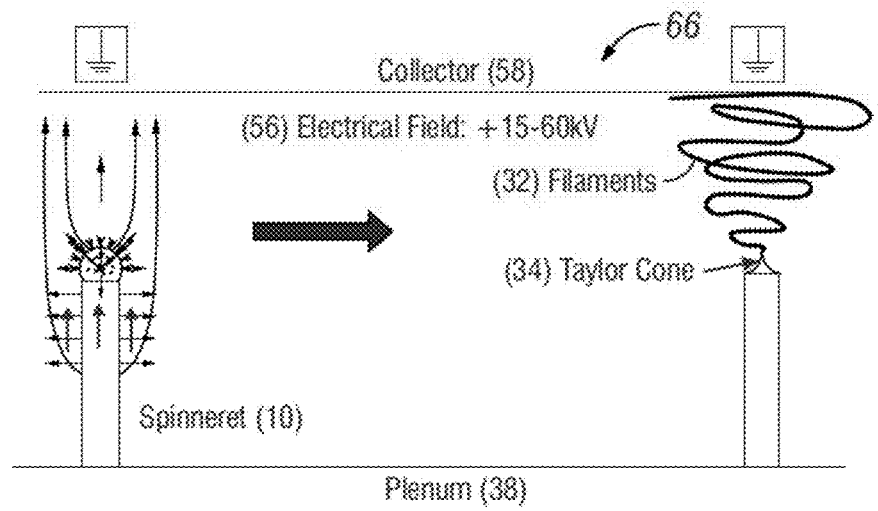
FIG. 4
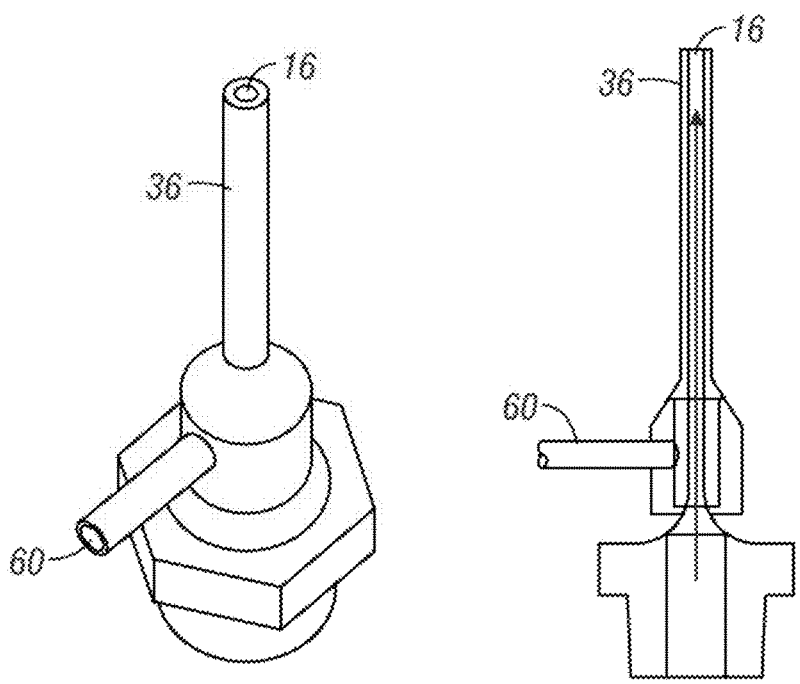
FIG. 5A  FIG. 5B

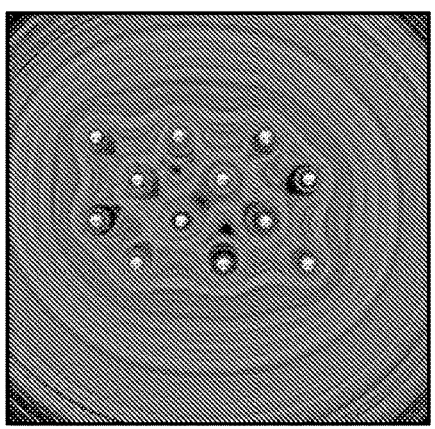 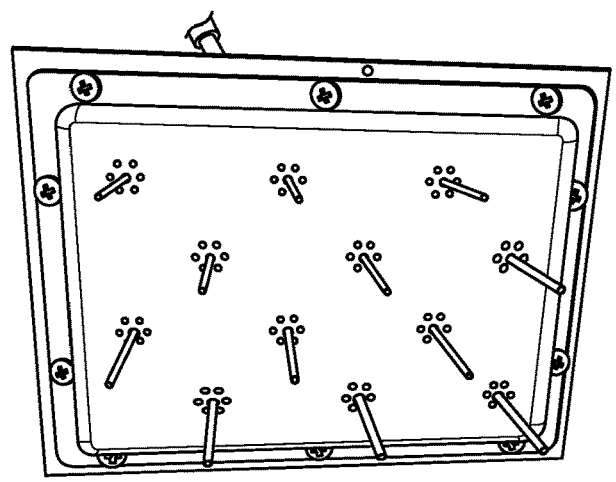
FIG. 14A
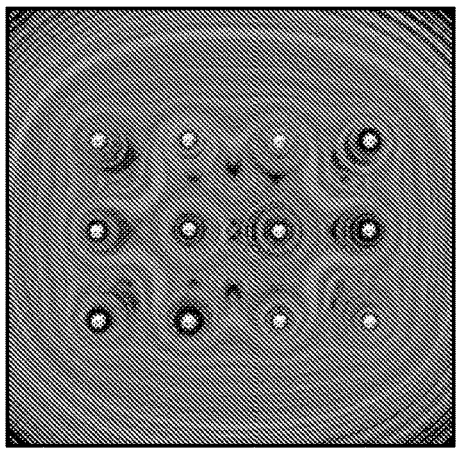 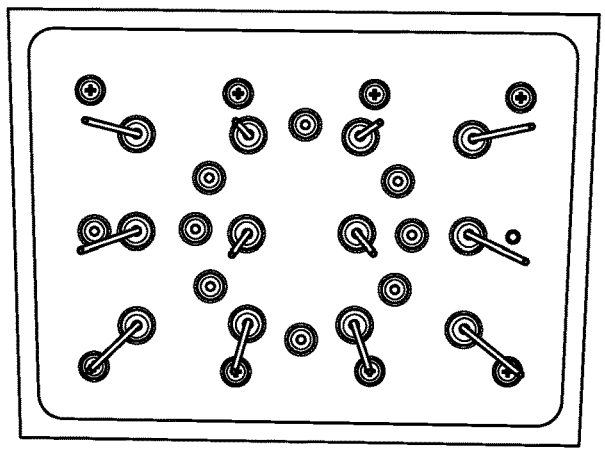
FIG. 14B
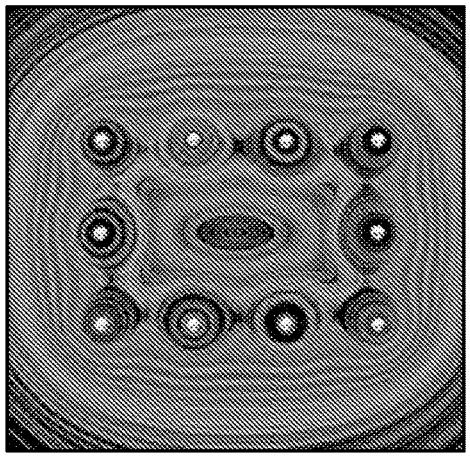 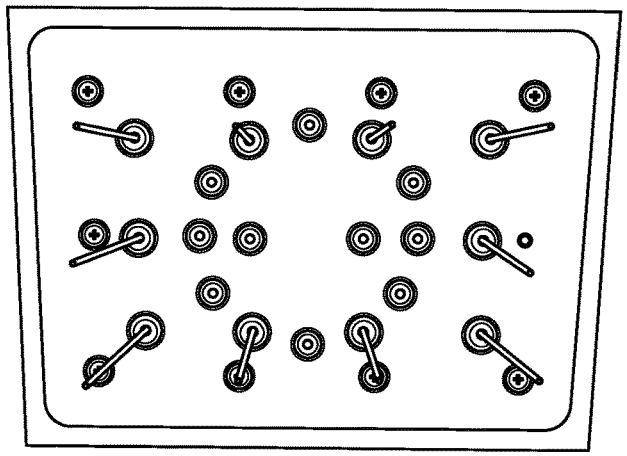
FIG. 14C

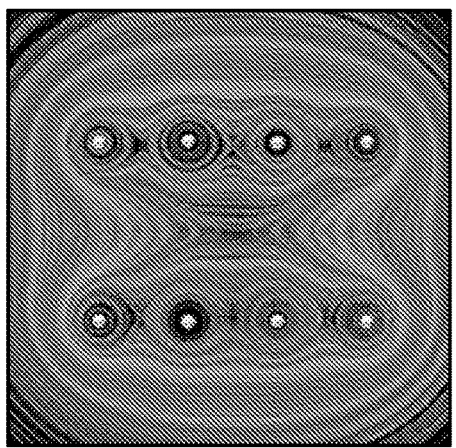 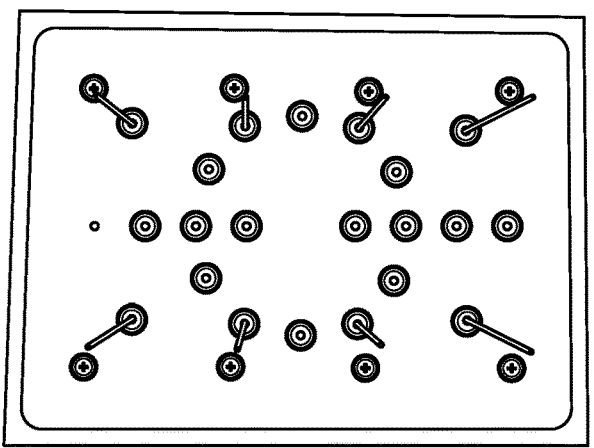
FIG. 14D
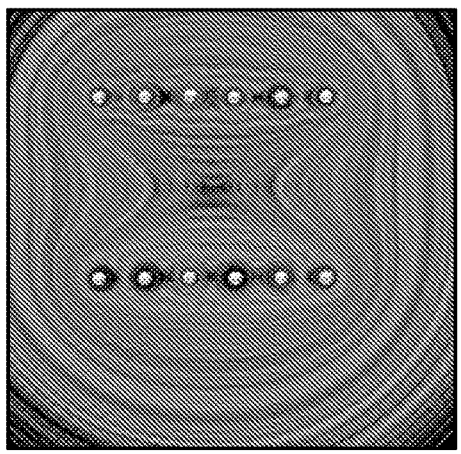 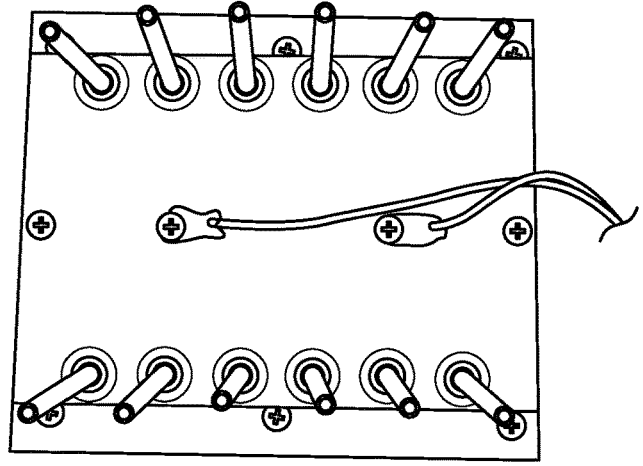
FIG. 14E
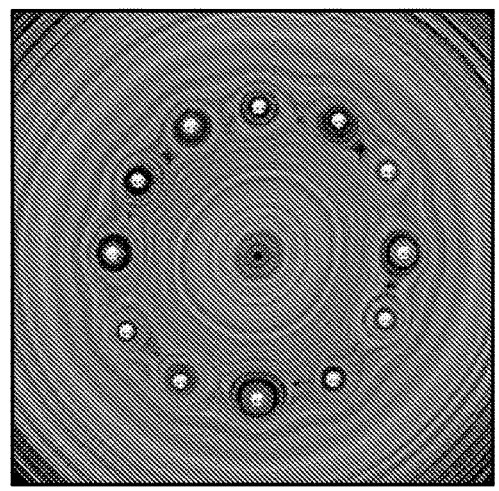 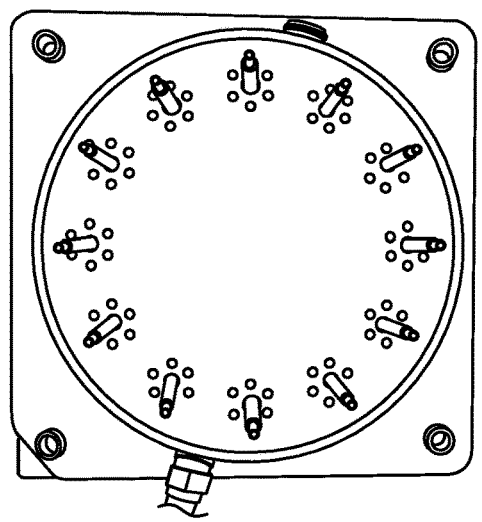
FIG. 14F

SPINNERETS AND SPINNERET ARRAYS FOR ELECTROSPINNING AND ELECTROSPINNING MACHINES

CROSS-REFERENCE TO RELATED APPLICATIONS

This application is a Continuation Application of PCT/US2017/065741, filed Dec. 12, 2017, which claims priority and is related to U.S. Provisional Application Ser. No. 62/433,061, filed on Dec. 12, 2016, and entitled "SPINNERETS AND SPINNERET ARRAYS FOR ELECTROSPINNING AND ELECTROSPINNING MACHINES." The entire contents of these patent applications are hereby expressly incorporated herein by reference including, without limitation, the specification, including figures, tables, Examples, and the claims.

GRANT REFERENCE

This invention was made with government support under Grant No. IIP-1329377, awarded by the National Science Foundation. The Government has certain rights in this invention.

FIELD OF THE INVENTION

The present disclosure relates to air-assisted spinnerets and spinneret arrays for electrospinning. In some embodiments, the air-assisted spinnerets and spinneret arrays are incorporated in electrospinning systems and/or electrospinning machines.

BACKGROUND OF THE INVENTION

Electrospinning production techniques are increasing in demand. The ability to produce nanofibers and nanofibrous mats from electrospun nanofibers has wide applicability in a number of industries. Thus, the design of innovative electrospinning equipment with a relatively high productivity rate has become an urgent technological demand. The equipment must be able to continuously and stably produce high-quality polymer nanofibers.

Polymer nanofibers have attracted growing interest for various applications such as filtration/separation, energy, sensor/detector, and biomedical engineering. Thus far, several techniques, including mechanical drawing, self-assembly, phase separation, and electrospinning, have been studied for making polymer nanofibers. Among these techniques, electrospinning is capable of producing thinner fibers via a contactless procedure than mechanical drawing, it is more facile and versatile than self-assembly, and it is applicable to a wider range of polymers than phase separation. The electrospinning technique has been widely adopted as a straightforward approach for the convenient preparation of polymer fibers with diameters typically being hundreds of nanometers (commonly known as electrospun polymer nanofibers). The electrospun polymer nanofibers are usually collected as overlaid mats (i.e., membranes or felts). The electrospun polymer nanofibers and/or nanofibrous membranes possess unique properties, particularly small diameters and the resulting large specific surface areas. Furthermore, the porosity/firmness of an electrospun polymer nanofibrous membrane can be readily tailored after mechanical pressing, or other post-production processing.

The electrospinning technique suffers from orders of magnitude lower productivity than the conventional spinning techniques like solution spinning and melt blowing. The commonly used setups for making electrospun polymer nanofibers are typically suitable for lab-scale preparations. For large scale, research, development, and production these systems are insufficient. The design of the electrospinning equipment with relatively high productivity rates has become an urgent technological demand. The equipment must be able to continuously and stably produce high-quality electrospun polymer nanofibers.

Accordingly, it is an objective of this invention to provide an improved spinneret.

Another object of the invention is to provide a spinneret that can be useful in commercial scale production methods.

Still a further object of the invention is to provide a spinneret can be used in an array and can reduce electrical field interference.

Yet another object of the invention is to provide a spinneret with minimized waste volume.

Still another object of the invention is to provide a spinneret array arrangement that minimizes turbulent interference regions between arrays and provides an electrical field suitable for electrospinning with an array of spinnerets.

Accordingly, it is an objective of this invention to provide a multiple spinneret (spinneret array) system and electrospinning machines having a spinneret array.

Still a further object of the invention is provide methods of preparing nanofibers and nanofibrous mats using the spinnerets and machines that have a spinneret array.

An advantage of the invention is that it can improve nanofiber and nanofibrous mat production rates. Thus, electrospinning techniques employing a spinneret array can benefit the industrial demand for large-scale preparation of polymer nanofibers.

Other objects, advantages and features of the present invention will become apparent from the following specification taken in conjunction with the accompanying drawings.

BRIEF SUMMARY OF THE INVENTION

In an embodiment, an air-assisted electrospinning spinneret includes a spinneret needle, wherein the spinneret needle is electrically conductive and comprises a tip, an enclosure, wherein the enclosure has a nozzle that the spinneret needle passes through, and a plurality of air holes in the nozzle, wherein each air hole defines an air path converging at the spinneret needle tip.

A further embodiment is directed towards a spinneret array includes two or more spinnerets of the previous embodiment for electrospinning, wherein the spinneret needles are separated to form a distance between the spinneret needles, and wherein the spinneret needles form a row or a circle.

A further embodiment is directed towards an electrospinning system includes the spinneret array of the previous embodiment.

In another embodiment, an electrospinning machine includes a plurality of spinneret arrays each comprising two or more spinnerets for electrospinning, wherein the spinnerets each comprise an electrically conductive spinneret needle, the spinneret needles being separated to form a distance between the spinneret needles and forming a row or a circle, and wherein the spinneret arrays are spaced apart from each other such that the spinneret needles are spaced apart in a ratio of the non-adjacent spinneret needles to adjacent spinneret needles of between about 3:1 and about 4:1. The electrospinning machine also includes a spin dope storage supply in fluid communication with the spinneret needles, a collector, wherein the collector is grounded, and an energy source, wherein the energy source is in electrical communication with the spinneret needles.

In yet another embodiment, a method of preparing an electrospun nanofibrous mat with the spinneret of the first previously mentioned embodiment includes transferring a spin dope to a spinneret needle, providing air pressure for an air-assist, electrically charging the spinneret needle, forcing the spin dope from within the spinneret needle to the needle tip and converging an air stream at the needle tip from the air-assist to form a Taylor Cone on the spinneret needle tip, forming a filament from the Taylor Cone, and collecting the filament on a collector.

In yet another embodiment, a method of preparing an electrospun nanofibrous mat with the electrospinning machine of the preceding embodiment includes transferring a spin dope to a plurality of spinnerets in one or more spinneret arrays, wherein the spinnerets comprise spinneret needles, which are spaced apart such that the ratio of non-adjacent spinneret needles to adjacent spinneret needles is between about 3:1 and about 4:1, electrically charging the spinneret needles, forcing the spin dope from within the spinneret needle to the needle tip to form a Taylor Cone, forming a filament from the Taylor Cone; and collecting the filament on a collector.

While multiple embodiments are disclosed, still other embodiments of the present invention will become apparent to those skilled in the art from the following detailed description, which shows and describes illustrative embodiments of the invention. Accordingly, the figures, detailed description, and examples are to be regarded as illustrative in nature and not restrictive.

BRIEF DESCRIPTION OF THE FIGURES

FIG. 3A shows an exemplary converging hole design having six converging air holes. FIG. 3B shows a diverging center hole design. FIG. 3C shows a straight coaxial large center hole design. FIG. 3D shows a straight coaxial small center hole design.

FIG. 4 is a diagram of the coaxial air flow forces on the Taylor Cone and its relationship on the formation of a filament.

FIGS. 5A and 5B show an exemplary anti-fouling spinneret including an outer needle sleeve that forms a channel for recovered spin dope. FIG. 5A shows a perspective view of an anti-fouling needle of the anti-fouling spinneret. FIG. 5B shows a front plan view of the anti-fouling needle of FIG. 5A.

FIG. 11A illustrates the physical forces. FIG. 11B illustrates the mechanical forces. FIG. 11C illustrates the electrical forces. FIG. 11D illustrates the chemical forces.

FIGS. 14A-F are spinneret arrays and their respective electromagnetic fields.

FIG. 14A shows a 12-needle staggered array at a 1:1 ratio and its electromagnetic field.

FIG. 14B shows a 12-needle aligned array at a 1:1 ratio and its electromagnetic field.

FIG. 14C shows a 10-needle aligned array at a 1:1 ratio and its electromagnetic field.

FIG. 14D shows an 8-needle aligned array at a 2:1 ratio and its electromagnetic field.

FIG. 14E shows a 12-needle aligned array at a 4:1 ratio and its electromagnetic field.

FIG. 14F shows a 12-needle circular array and its electromagnetic field.

Figure 1A:
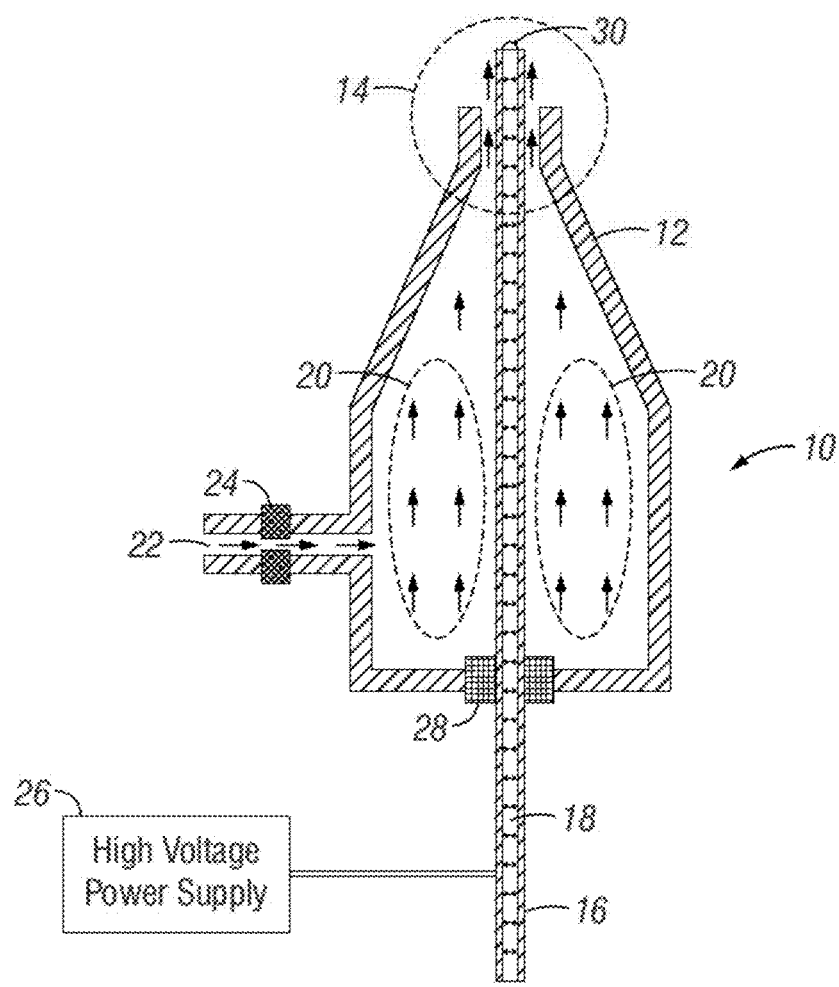
FIG. 1A shows a schematic view of an exemplary air assisted spinneret, according to aspects of the disclosure. The air-assisted electrospinning utilizes both electric force and co-axial air flow along the spinning direction for the preparation of nanofibers, and the spinneret may possess a core-shell design to separate a spinning solution and an air flow. During the air-assisted electrospinning process, the solution is supplied to the core section (i.e., the needle section in FIG. 1A).

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE INVENTION

The embodiments of these inventions are not limited to particular methods of electrospinning or the individual ingredients used in a desired electrospinning process, e.g., the polymers, which can vary and are understood by skilled artisans. While the new air assisted spinnerets are described and disclosed herein, it should be understood that the spinneret arrays and electrospinning machines can employ different spinnerets (e.g., traditional air assisted spinnerets and liquid spinnerets) in addition to or in place of the spinnerets described herein. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Similarly, the term "or" is intended to include "and" unless the context clearly indicate otherwise. The term "or" means any one member of a particular list and also includes any combination of members of that list. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

Definitions

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, distance, voltage, current, and electromagnetic field. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

As used herein, the term "microfiber" refers to a fiber having a diameter larger than about 1.0 micrometer and generally between about 1.0 micrometers and about 1.0 millimeters.

As used herein, the term "nanofiber" refers to a fiber having a diameter smaller than about 1.0 micrometer and generally between about 10 nanometers and about 1.0 micrometers.

As used herein, the term "nanofibrous mat" is synonymous and interchangeable with the terms "nanofibrous membrane," "nanofiber membrane," "nanofibrous felt," and "nanofiber felt," and refers to a collection of nanofibers in an overlapping array, which may optionally include microfibers added for enhancing desired mechanical properties, such as strength, flux, conductivity, etc. The "nanofibrous mat" can be formed into any shape and is not limited by shape.

Electrospinning Process

In general, the electrospinning process is comprised of three stages: (1) initiation of an electrospinning jet (i.e., filament) and the extension of this filament along a straight trajectory; (2) growth of the bending/whipping instability and the further elongation of the filament which allows it to become very long and thin while following a looping/spiraling path; and (3) solidification of the filament through solvent evaporation, leading to the formation of polymer nanofiber. Typically, a syringe pump is utilized to control the flow rate of spinning solution during electrospinning. The flow rate should be categorized as inflow (i.e., supply) rate and outflow (i.e., consumption) rate. A syringe pump, or other means of creating spin dope feed can only control inflow rate. The outflow rate, on the other hand, is contingent upon the solution properties, the electrostatic field, the spinneret design, and other factors (e.g., the coaxial air flow along the spinning direction). When the inflow and outflow rates are the same, the electrospinning process will be stable and the resulting nanofibers will generally have uniform morphologies (e.g., fiber diameters). If the inflow rate is a little less than the (maximum) outflow rate, the process can self-adjust/reduce the outflow rate to match the inflow rate. However, if the inflow rate is considerably greater than the (maximum) outflow rate, the solution droplet on the tip of spinneret (commonly known as the Taylor Cone) will not be able to retain a constant shape; as the electrospinning process continues, the droplet will become larger and eventually drip off the tip of the spinneret. Such a situation will make the electrospinning process unstable, and the morphologies of the resulting nanofibers will no longer be uniform.

The introduction of directed coaxial air flow along the spinning direction can effectively stabilize the electrospinning process by maintaining an optimal shape of the solution droplet at the spinneret tip and by controlling the fly pattern of electrospinning jet/filament. More importantly, the directed coaxial airflow will significantly improve nanofiber productivity. The nanofiber productivity can preferably be increased two-fold, or even more preferably three-fold. The coaxial airflow will also facilitate the evaporation of solvents throughout the electrospinning process by enhancing the bending instability process. The air-assisted electrospinning technique will be able to address the industrial demand for large-scale preparation of polymer nanofibers.

Air Assisted Spinneret

The present disclosure provides an air-assisted spinneret 10 which applies a coaxial flow 20 directed along the spinning trajectory during the process of electrospinning through a converging air hole design 70. Without wishing to be bound by the theory, it is believed that the introduction of directed coaxial air flow 20 surrounding the electrospinning spinneret 10 via a plurality of converging air holes 46 can supplement the electrostatic repulsive forces. The combination of electric force and air flow 20 thereby increases the (maximum) outflow rate. Further, the directed coaxial air flow 20 can also improve the stability of the electrospinning process by maintaining the constant shape of the Taylor Cone 34. The air flow 20 can provide the additional benefit of facilitating the fast dissipation/removal of solvent vapor, thereby preventing, or at minimum mitigating, the collected nanofibrous mat 90 from filming. Thus, the air-assisted spinnerets 10 provide an improvement suitable for making the large-scale production equipment nanofibers 88 and/or nanofibrous materials to fulfill the commercialization demand.

Non-limiting, exemplary designs are shown in FIGS. 1A-1C, 2, and 5. An air-assisted electrospinning spinneret 10 can include a spinneret needle 16, an enclosure 12, an optional insulating gasket 28, a device 40 that stores and supplies spinning solution, an air supply system 44, a power supply 26, and a nozzle section 14 wherein the spinneret needle 16 exits the enclosure 12 and wherein air flow 20 exits the enclosure 12. The spinnerets 10 can be designed and prepared with consideration of the composition of the spin dope 18, spin dope feed rate 80, the length of the spinneret needle 16, the air pressure and coaxial air flow 20, the physical stand-off distance and movement of the collector 58, the electrospinning environment including ambient temperature, relative humidity, air exchange rate, and electromagnetic and electrostatic forces.

Spin Dope Storage and Supply

Suitable devices 40 for storage and supply of spinning solution 18 (i.e., spin dope) can include, but are not limited to, a spin dope plenum 38, spin dope reservoir, fluid lines, valves, flow and pressure controls, and combinations thereof. The spin dope storage device 40 is in fluid communication with the spin dope needle 16. Preferably the spin dope storage device 40 has a regulator for controlling flow of the spinning solution 18. In some embodiments, the spinneret needle 16 can be in fluid communication with more than one device 40 to supply spinning solution 18 such that polymer blends can be prepared or such that particular polymer spinning solutions can be selected and changed. In an embodiment preparing a blend, multiple spin dope reservoirs can exist with different polymers and polymer spinning solutions from those can be transferred via fluid communication to a spin dope plenum 38 where they are mixed to form a blended spinning solution 18. In another embodiment, different polymer spinning solutions can be combined fluidly before arriving at the spinneret needle 16 or at the time of entering the spin dope needle 16.

Enclosure

Figure 1B:
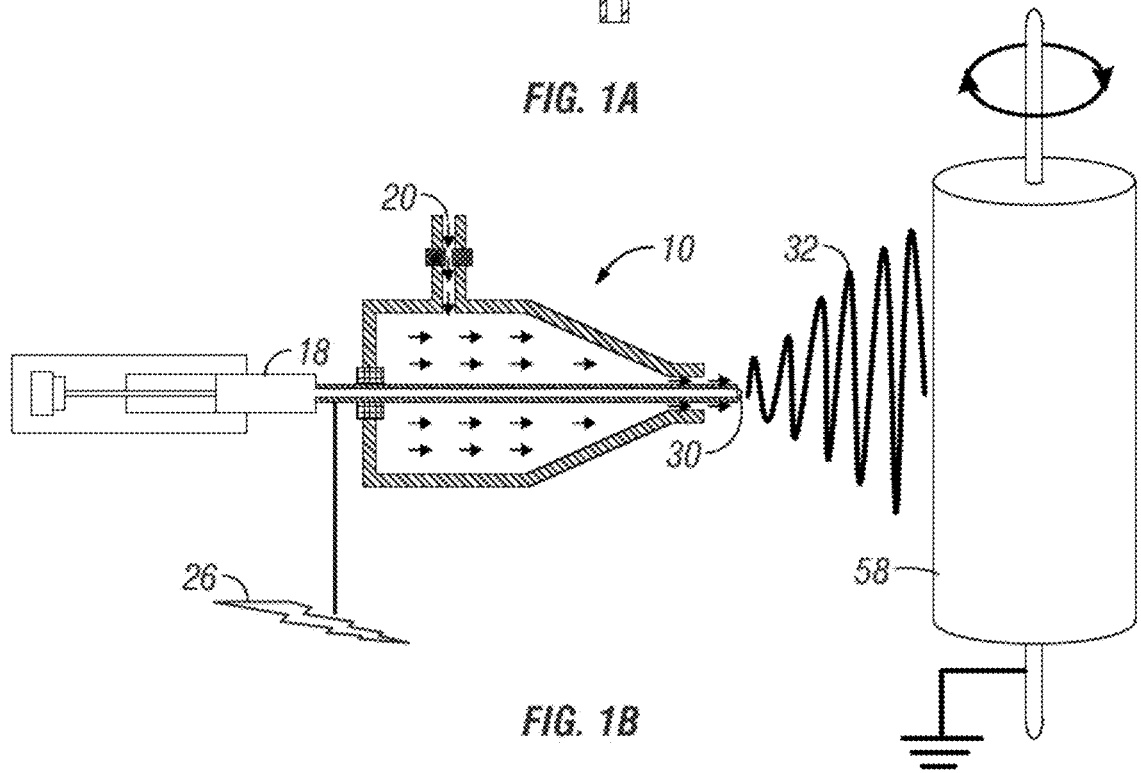
FIG. 1B shows an air-assisted electrospinning setup including a device to supply spinning solution, an air blowing system, a high voltage power supply, and the electrically grounded collector.

The spinneret 10 can include an enclosure 12 having a nozzle 14 at one end. The enclosure 12 can house the spinneret needle 16 and air and separate the spinning solution 18 and air flow 20, as schematically shown in FIGS. 1A-1B. The spinneret needle 16 extends from the enclosure 12 at the nozzle end of the spinneret 10. The nozzle 14 can be tapered; however, this is not required. The enclosure 12 can have any shape and size for the particular desired application. Preferably, the enclosure 12 is cylindrical and tapers at the nozzle 14, as shown in FIGS. 1A-1C and 2. The enclosure 12 can include an air inlet 22. The air inlet 22 can comprise a regulating valve 24 or other air flow control.

During the air-assisted electrospinning process, the spin dope solution 18 is supplied to the needle 16 while a continuous filament 32 is pulled out from the solution 18 upon the joint action of electric force and air flow 20 as demonstrated in FIG. 1B. FIG. 4 shows an exemplary diagram of the relationship between the coaxial air flow 20 and maintenance of the Taylor Cone droplet 34 and the formation of a filament 32 during electrospinning. The flow rate to the spinneret 10 can be adjusted to accommodate the formulation of spin dope 18 or blend that is being supplied. For example, the 1 ml/hr flow rate for the original spinneret can be increased to more than 2 ml/hr per each air assisted spinneret 10.

The nozzle 14 can comprise a plurality of converging air holes 46. According to an aspect of the disclosure, the air holes 46 are angled so that the air flow path 20 converges at the tip 30 of the spinneret needle, which focuses the air stream 20 at the tip 30 of the spinneret needle (see FIGS. 2 and 3A). The air-assisted electrospinning process utilizes both electric force and coaxial air flow 20 along the spinning direction for the preparation of nanofibers 88. The spinning solution 18 is forced from the spinneret needle 16 to form a filament (Jet) 32 as exemplified in FIG. 1B. The filament 32 is introduced into an electrical field 56 formed by high voltage 26 as the spinneret needle 16 is charged. The coaxial air flow 20 can generate additional stretching force, leading to the substantially increased (maximum) outflow rate of spinning solution 18. The air flow 20 can assist the Taylor Cone 34 to retain a constant shape and to facilitate the solvent evaporation during the bending/whipping instability process. While not wishing to be bound by the theory, it is believed that the air stream 20 not only assists keeping the Taylor Cone 34 in place and having a proper shape, but also assists lowering the surface tension of the Taylor Cone 34 to permit formation of the filament 32 and nanofiber 88. As a result, the air-assisted electrospinning process can be more stable at higher productivity rates, and the resulting nanofibers 88 can be more uniform morphologically and structurally. This makes such air-assisted electrospinning a feasible approach for large-scale production of polymer nanofibers 88.

Figure 3A:
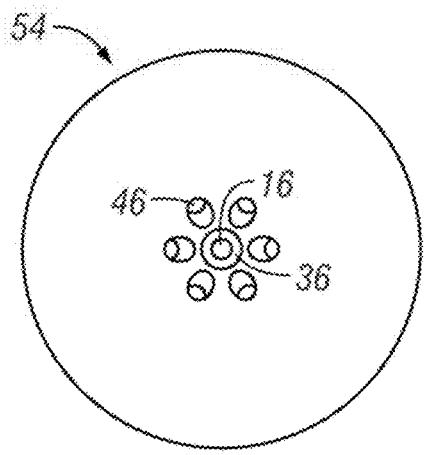
FIGS. 3A-3D show different coaxial air flow designs for air-assisted spinnerets.
Figure 3B:
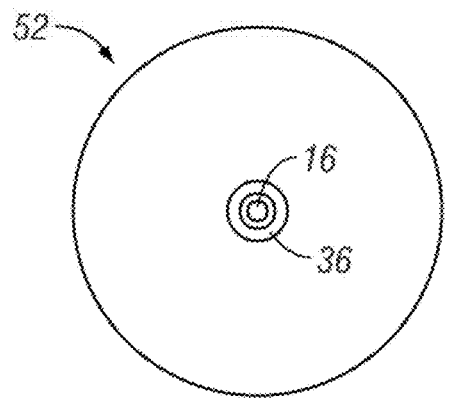
Figure 3C:
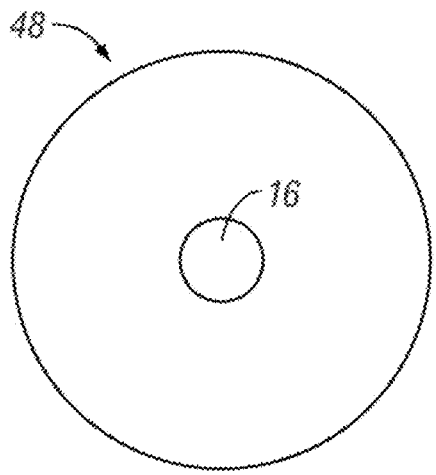
Figure 3D:
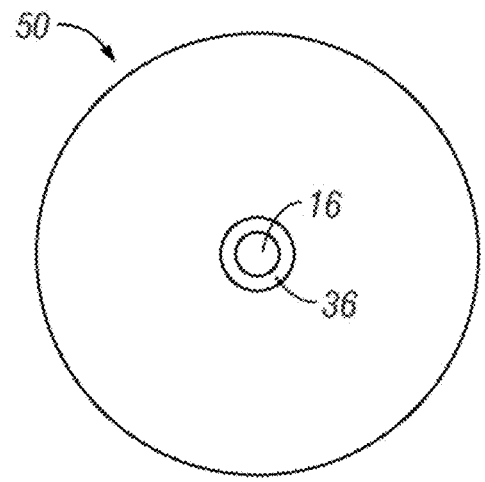

Some of the difficulties that arise during spinneret design relate to the coaxial air flow 20. Traditional air assisted spinnerets use coaxial nozzles that force air assist along the center line of the spinneret. Exemplary configurations of this are shown in FIGS. 3C and 3D. FIG. 3C shows a straight coaxial large center hole design 48. FIG. 3D shows a straight coaxial small center hole design 50. While a straight coaxial air assist design 48, 50 has the potential to improve the speed of the filament 32 formation and polymer travel from the needle tip 30, it detracts from proper Taylor Cone 34 formation and thereby damages proper nanofiber 88 formation in the filament 32. Likewise, a diverging hole design 52 also hinders proper Taylor Cone 34 formation and suffers from the same filament 32 and nanofiber 88 formation problems. FIG. 3B shows an exemplary diverging center hole design 52. The damage to the filament 32 and nanofiber 88 formation, makes the straight coaxial and diverging hole designs 48, 50, 52 impractical for use in an electrospinning process.

However, it was found that a converging hole design 54 resulted in air flow that helped to control the shape of the droplet (Taylor Cone) 34 such that the profile of the Taylor Cone 34 could be formed to more ideally interact with the electrical field 56, instead of becoming too large and dripping off the spinneret 10 to become waste. It was also found that the coaxial airflow 20 also efficiently propels the filament 32 towards the collector 58, while assisting the evaporation of the solvents within the filaments 32. Thus, the coaxial air flow 20 allows the filament 32 to dry when it reaches the collector 58 so that a nanofibrous mat 90 forms, instead of a film.

The enclosure can have any suitable number of converging air holes 46. Preferably there are between 4 and 50 air holes 46, more preferably between 4 and 12, and most preferably between 6 and 8 air holes 46. In a preferred embodiment, the number of air holes 46 is an even number such that the air holes 46 are symmetrically and radially arranged around the nozzle end of the spinneret 10. The diameter of the air holes 46 can be tailored for the particular spinneret design 48, 50, 52, 54. Factors that can influence the size of the air holes 46 include, but are not limited to, the size of the enclosure, needle gauge, air pressure, and desired air velocity. Preferably the air holes 46 are between about 0.1 mm and 2.5 mm in diameter. The angle of the air holes 46 can also be tailored for the particular spinneret design 48, 50, 52, 54 and will be related to the distance the needle 16 extends beyond the enclosure. According to an aspect of the present disclosure, the air holes 46 are angled such that the air path 20 converges at the needle tip 30.

The enclosure 12 can house a spin dope plenum 38. In another embodiment, the spinneret needle 16 is in fluid communication with a spin dope storage and supply 40 that is located outside the enclosure 12. In such an embodiment, the needle 16 can optionally pass through the enclosure 12 at the end opposite of the nozzle 14. The enclosure 12 can optionally include an insulating gasket 28 that insulates the needle 16 or a fluid communication line for transferring the spinning solution 18 to the needle 16 from a device 40 for supplying spinning solution.

The enclosure 12 can be made of any suitable material. Preferably it is non-conductive. Preferably, the enclosure is made of a polyolefin, polypropylene, nylon, polytetrafluoroethylene, or a combination thereof. The enclosure 12 can be dyed or painted. In an embodiment, the enclosure 12 can be painted with a non-conductive paint.

Spinneret Needle

Figure 2:
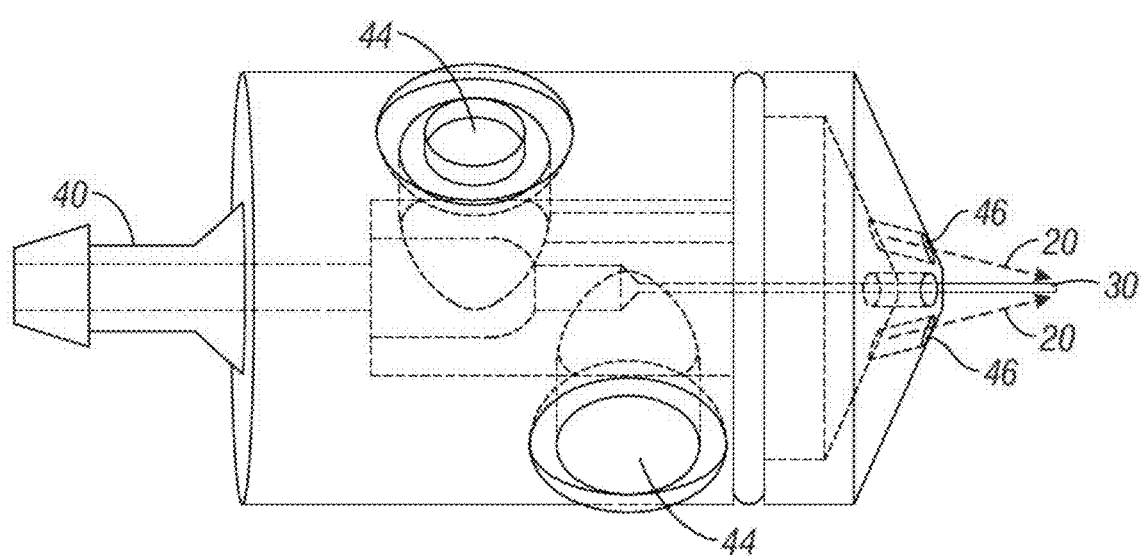
FIG. 2 shows a side plan view of an exemplary embodiment where the air flow path is seen converging at the spinneret needle tip. Air pressure is delivered to the coaxial spinneret though the use of a novel spinneret enclosure that incorporates a plurality of converging air holes angled to focus the air stream and allow coaxial air flow to the spin dope at the tip of the spinneret needle.

The air-assisted spinneret 10 comprises a spinneret needle 16. The air-assisted spinneret needle 16 exits the enclosure 12 at the enclosure's nozzle 14 and the spinneret needle's tip 30 extends beyond the enclosure 12. The spinneret needle 16 transmits the spin dope 18. In an embodiment, the spinneret needle 16 can further comprise an outer needle sleeve 36. The outer needle sleeve 36 can act as a shield and attenuate the electrical field 56. Further, if excess spin dope 18 develops at needle tip 30 forming a droplet 34, the outer sleeve 36 can serve as a spin dope recovery channel 60 that captures unused spin dope 18 and returns it to the device for supplying spinning solution. Excess spin dope 18 may collect at the needle tip 30 if the droplet 34 forms incorrectly or if the needle tip 30 is not inserted into the electrical field 56. Non-limiting examples of such a spinneret 10 having an outer sleeve 36 are provided in FIGS. 5A and 5B. FIG. 2 also shows an inner 16 and outer needle 36 in an exemplary spinneret 10.

The spinneret needle 16 can have any suitable inner diameter for the particular electrospinning process. Preferably the inner diameter is between about 0.4 mm and about 1.5 mm and more preferably the inner diameter is between about 0.5 mm and about 1 mm. As needles 16 are often manufactured and sold in gauges, preferred gauges are also described herein. For example, preferably the spinneret needle 16 has a gauge of between 14 and 22.

The spinneret needle 16 can be any length suitable for the electrospinning conditions set forth in the previous paragraph, based on the spinneret array 64, and configuration of the electrospinning machine 70. Preferably, the spinneret needle 16 is between about 0.5 inches and about 12 inches in length; more preferably, the spinneret needle 16 is between about 0.75 inches and about 6 inches in length; and most preferably the spinneret needle 16 is between about 1 inch and about 4 inches in length.

According to an aspect of the present disclosure, the spinneret needle 16 can begin at the enclosure surface on the nozzle end and extend beyond the enclosure 12, but not be contained within the enclosure 12. In such an embodiment, the needle 16 is in fluid communication with the spin dope storage and supply 40.

Figure 1C:
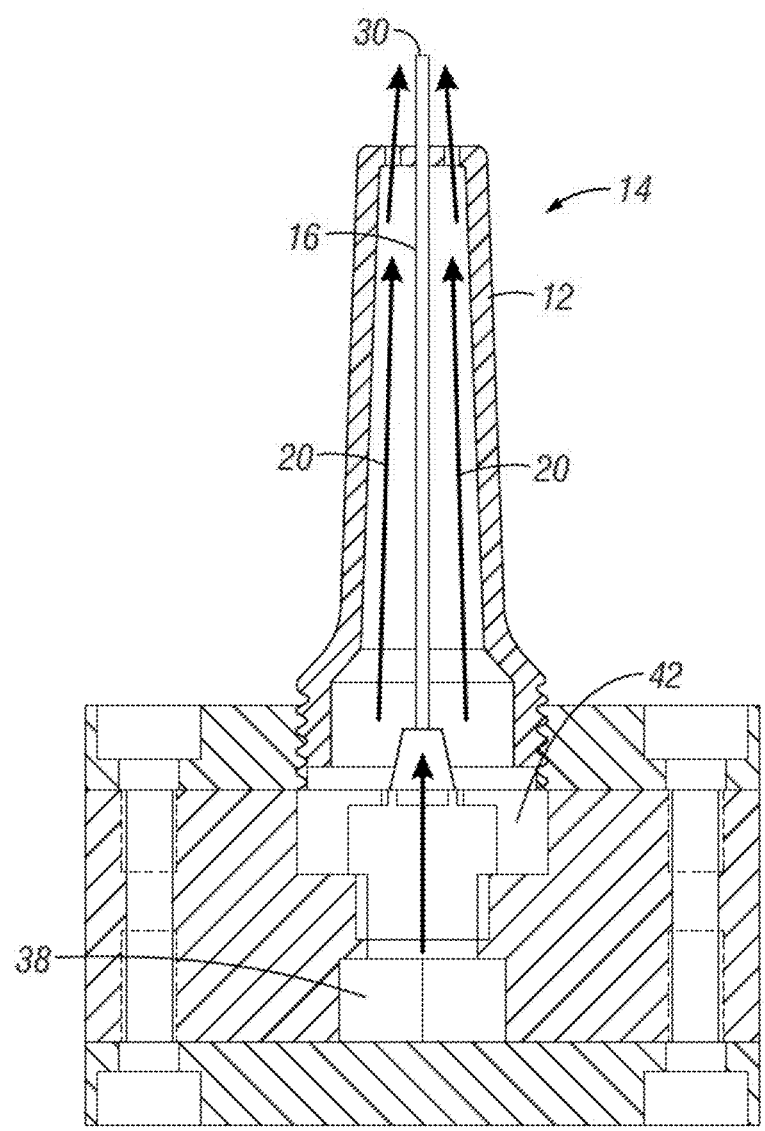
FIG. 1C shows a detailed view of the exemplary air-assisted spinneret of FIG. 1A. This exemplary air-assisted spinneret has a 16-gauge needle, a spin dope plenum, and air assist plenum. Also shown is the spin dope spin dope flow path, the air assist flow path, and the extension of the spinneret needle beyond the enclosure nozzle.

According to an aspect of the present disclosure, the distance that the spinneret needle 16 extends beyond the enclosure 12 can be any desired distance for the particular spinneret design 48, 50, 52, 54. Preferably the needle 16 extends beyond the enclosure 12 at a distance between about 0.2 inches and 4 inches and more preferably between about 0.4 inches and 1.5 inches. This distance is best shown in FIG. 1C.

The spinneret needle 16 is conductive. According to an aspect of the present disclosure, the spinneret needle 16 is in electric communication with a power supply 26. Preferably, the power supply 26 is a high voltage power supply. The power supply 26 can be turned on and off. Thus, preferably, the spinneret needle 16 is comprised of a conductive material such as a metal or conductive polymer material. In an embodiment, the spinneret needle 16 can be coated with a conductive material.

Air Supply System

The spinneret 10 is in fluid communication with an air supply 44. The air supply system 44 can include a blowing system, a pressure regulator, a regulating valve 24, a line for transferring air, an air inlet 22, and an air plenum 42. One or more components of the air supply system 44 can be housed within the enclosure 12 or part of the enclosure 12. For example, the enclosure 12 can house an air plenum 42 and an air inlet 22 can be part of the enclosure 12. An air plenum 42 in the spinneret 10 or spinneret array 64 can minimize excess plumbing in the electrospinning system 66.

The air supply system 44 can be in communication with a control system that can control the air pressure and flow.

Spinneret Array

A spinneret array 64 can be prepared having two or more spinnerets 10. Previously, the arrangement of multiple spinnerets 10 has been hampered, or even rendered inoperable, by the electrostatic and electromagnetic forces that exist within the electrical field 56 of a spinneret array 64. Moreover, as the number of spinnerets 10 increases and as the density increases, more disturbances and interference are found within the electromagnetic field 56 rendering it inoperable or impractical for electrospinning. This has significantly hindered the ability to use multiple spinnerets 10 for large scale manufacturing processes.

Figure 6A:
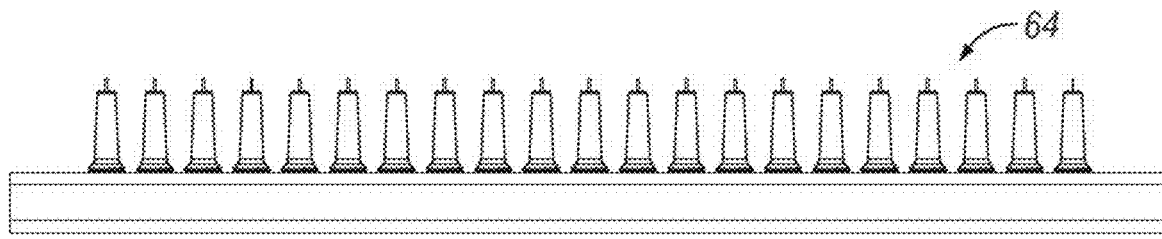
FIG. 6A shows a side elevation view of an exemplary spinneret array having 21 spinnerets.
Figure 6B:
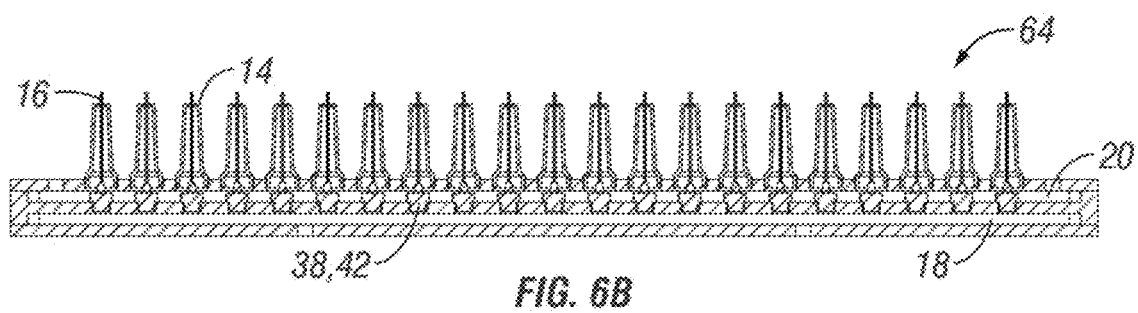
FIG. 6B shows a side plan view of the spinneret array of FIG. 6A wherein an air plenum and spin dope plenum are visible.
Figure 6C:
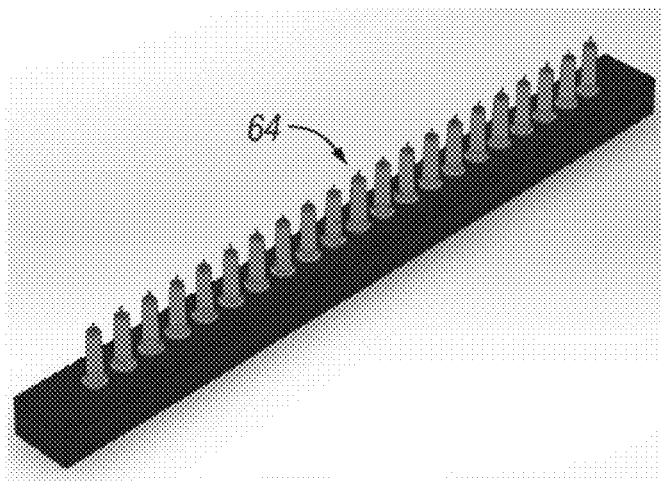
FIG. 6C shows a perspective view of the spinneret array of FIG. 6A.
Figure 6D:
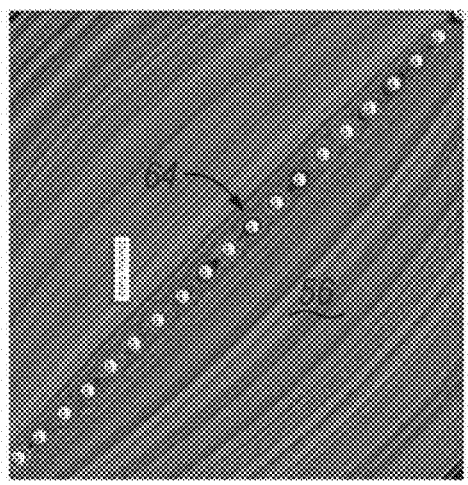
FIG. 6D shows a top view of the electromagnetic field formed around the spinneret array of FIG. 6A.

Two configurations of spinneret arrays 64 have been identified that can employ a plurality of spinnerets 10 in a large-scale production system. The number of spinnerets 10 will be dependent on the desired production rate of the system. The spacing between each spinneret 10 will be as densely populated as possible to produce the desired electrical field 56. It is critical that the electrical field 56 is kept non-turbulent and stable through the proper spacing of the arrays 64 in order to allow the spinnerets 10 to function properly. Factors that influence the design of the array 64 include, but are not limited to, the electromagnetic field 56, electrical interference and turbulence resulting from the spinnerets 10 and spinneret arrays 64, and mechanical requirements. The spinneret density is informed by a ratio that maintains a proper operation spacing so that the electrical fields 56 created by the individual spinneret arrays 64, minimize, or preferably do not cause, turbulence hindering a properly developed electrical field 56. Thus, each spinneret array's electrical field 56 can be designed to provide a spacing among arrays 64 such that adjacent electrical fields 56 do not disrupt each other, thereby providing a stable, non-interference based environment for proper electrospinning performance. This can be visualized in an electromagnetic field 56 having electromagnetic field lines that are elliptical in shape and substantially parallel, as shown in FIG. 6D. Such a shape would be akin to laminar flow in fluid dynamics. This is referred to herein as a stable electromagnetic field.

Figure 7A:
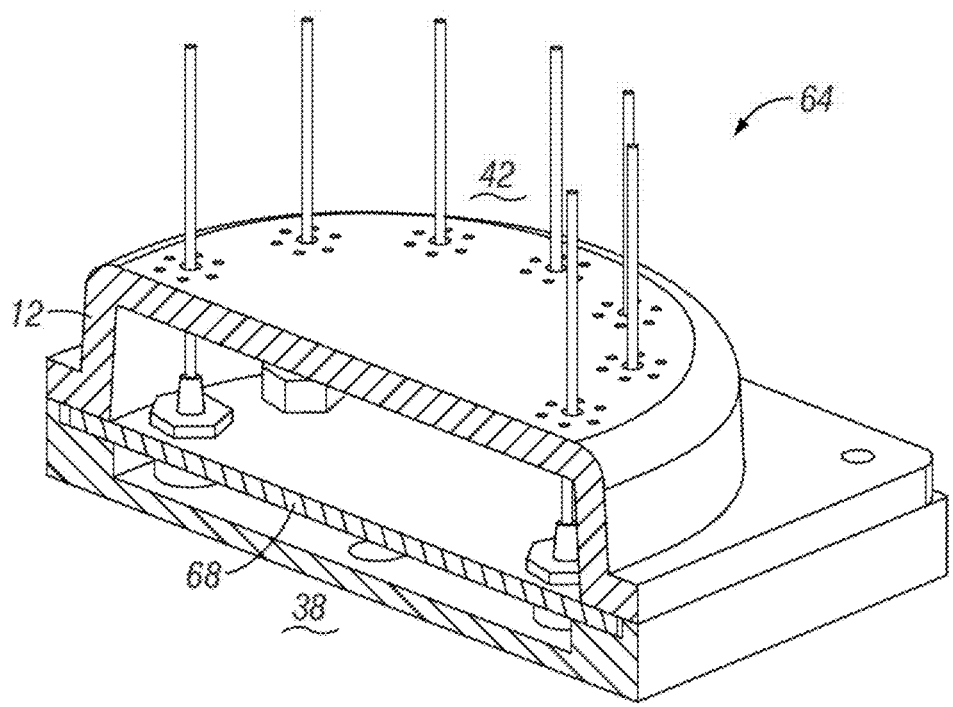
FIG. 7A shows an exemplary plan view of a 12-needle spinneret circular array.
Figure 7B:
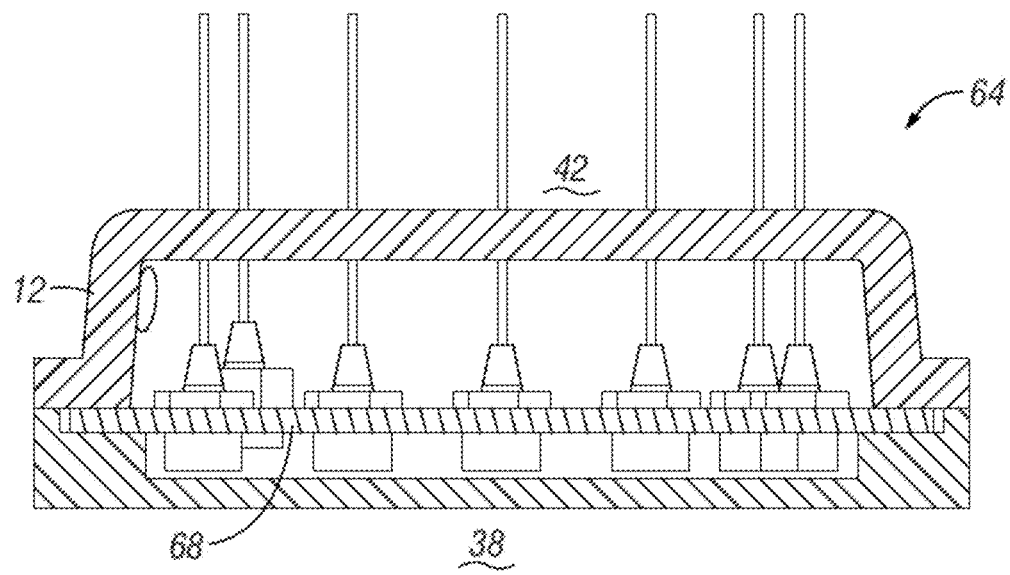
FIG. 7B shows a side plan view of the spinneret circular array of FIG. 7A.

In a preferred embodiment, the spinneret array 64 employs the air-assisted spinnerets 10 described herein. However, the presently described spinneret arrays 64, electrospinning systems 66, and electrospinning machines 70 are not limited to the air-assisted spinnerets 10 described above and can include other spinnerets 10. If using the air-assisted spinnerets 10 described herein, preferably the spinneret needles 16 will comprise an outer spinneret sleeves 36 as the outer sleeve 36 can provide maximum needle coverage and electrical field insulation. A spinneret 10 that attaches to both a spin dope plenum 38 and air plenum 42 is ideal to minimize excess plumbing. A common High Voltage (HV) plane 68 can be incorporated to minimize excess wiring within the system, as is shown in FIGS. 7A-7B.

Using an electrostatic modeling program and experimentation, arrangements of spinnerets 10 have been developed and incorporated into the design 48, 50, 52, 54 of the spinneret array 64 and electrospinning systems 66 comprised of two or more spinneret arrays 64. In a preferred embodiment, the spinneret arrays 64 and/or electrospinning systems 66 employ air-assisted spinnerets 10. The spinneret arrays 64 described herein are scalable both in the quantity of spinnerets 10 per array and the number of arrays 64 that can be employed in an electrospinning system 66. Preferably, the spinneret arrays 64 and electrospinning systems 66 can be designed to achieve a desired level of nanofibrous mat 90 production. The optimal spatial arrangement of the spinneret arrays 64 in an electrospinning system 66 have been determined based upon the modeling and experimentation that considers the composition of the spin dope 18, spin dope feed rate, the length of the spinneret needle 16, the insulating properties of the spinneret enclosure 12, the physical standoff distance and linear velocity of the collector 58, the electrospinning environment including ambient temperature, relative humidity, air exchange rate, and electromagnetic and electrostatic forces, and in an air-assisted spinneret design 48, 50, 52, 54, the air pressure and coaxial air flow 20.

The spinneret arrays 64 can be configured in a single row having two or more spinnerets 10 or circularly arranged in a circle having six or more spinnerets 10. The spinnerets 10 should be spaced apart sufficiently for mechanical design of the separate spinneret components. The number of spinnerets 10 in an array 64 can be between 2 and 1,000,000. Preferably, an array includes between 3 and 500,000, more preferably between 4 and 250,000, and most preferably between 4 and 100,000. Further, an electrospinning system 66 can include two or more spinneret arrays 64 such that the system can have the desired number of arrays for the nanofibrous mat 90 production size and volume desired. Thus, the number of spinnerets 10 in an array and the number of arrays 64 in a system can be adjusted to match the desired size of the nanofibrous mat 90 being prepared and production volume desired.

Figure 8:
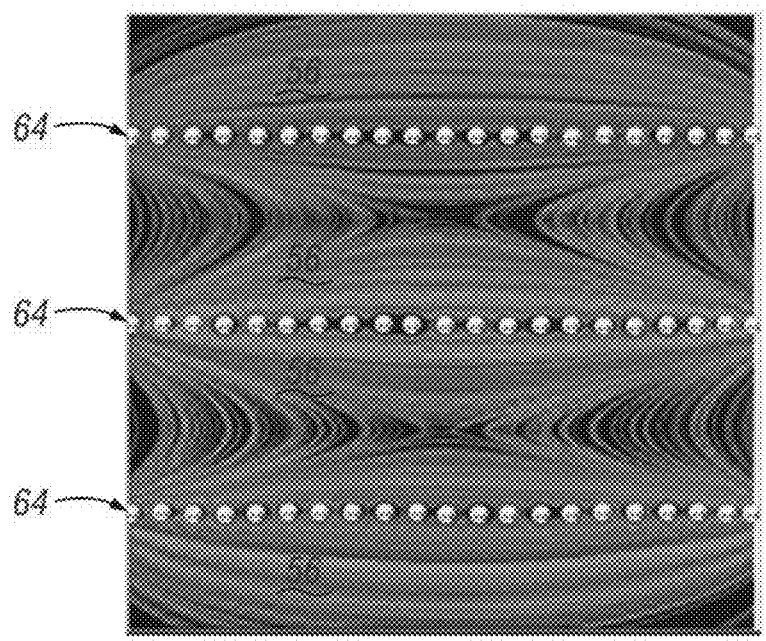
FIG. 8 shows a top view of an electromagnetic field formed around three spinneret arrays of twenty-one spinnerets in each array.

In a preferred embodiment, the spinnerets 10 are arranged in a row to form an array 64, which produces the desired non-turbulent, stable electromagnetic field 56 having electromagnetic field lines that are elliptical in shape and substantially parallel. Such an electromagnetic field 56 permits the array 64 to work in an electrospinning process. An elevation view of an exemplary spinneret array 64, having 21 spinnerets 10, is shown in FIG. 6A. FIG. 6B shows a cross-sectional view of FIG. 6A where an air plenum 42 and spin dope plenum 38 are visible. FIG. 6C shows a perspective view of the same exemplary spinneret array 64. FIG. 6D shows the electromagnetic field 56 formed around this exemplary array 64. FIG. 6D demonstrates that the array 64 can be prepared such that there are minimal, and preferably, no interferences between the spinnerets 10. The properly developed electromagnetic field 56 is evident in the elliptical and substantially parallel appearance of the electromagnetic field lines around the spinneret array 64 as shown in FIGS. 6D and 8.

In another embodiment, the spinnerets 10 can be arranged in a circular configuration. FIGS. 7A and 7B show an exemplary 12-needle circular configuration in cross-sectional (plan) views. In these exemplary embodiments, the enclosure 12 is referred to as an air plenum cover.

Surprisingly, the distance between spinnerets 10 adjacent to each other in an array 64 is not critical in preventing electrical interference. Rather, the distance between spinnerets 10 not adjacent to each other creates interference problems. The spatial relationship is affected by the energy in the system. Having a spatial relationship of between about 3:1 and 4:1 of non-adjacent spinneret needles 16 to adjacent spinneret needles 16 is preferred, and a ratio of at least 4:1 is most preferred.

Further, the two or more spinneret arrays 64 can be arranged to minimize interference between the electromagnetic fields 56 overcoming the problems in this art. FIG. 8 shows an exemplary electromagnetic field 56 that has three spinneret arrays 64 of twenty-one spinnerets 10 in each array 64 where the distance between spinneret arrays 64 is about four times the distance between adjacent spinneret needles 16 in the arrays 64. Thus, the ratio between non-adjacent spinneret needles 16 to adjacent spinneret needles 16 within an array is about 4:1. FIG. 8 shows there are good electromagnetic fields 56 around each array, as evidenced by the substantially parallel and elliptical shaped electromagnetic field lines. The disturbances, reflected in the black, are minimized with this configuration.

Electrospinning Machine

Figure 9A:
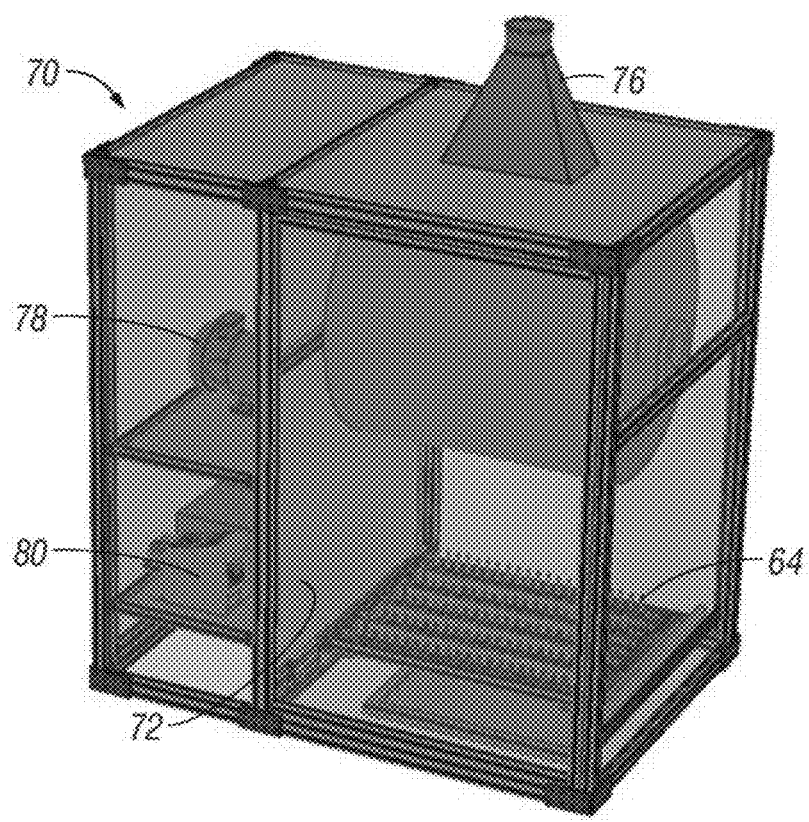
FIGS. 9A-B show front and rear perspective views an exemplary electrospinning machine having row type spinneret arrays with a roller as a collector and a protective cover to capture and recover vapors created by solvents during the electrospinning process.
Figure 9B:
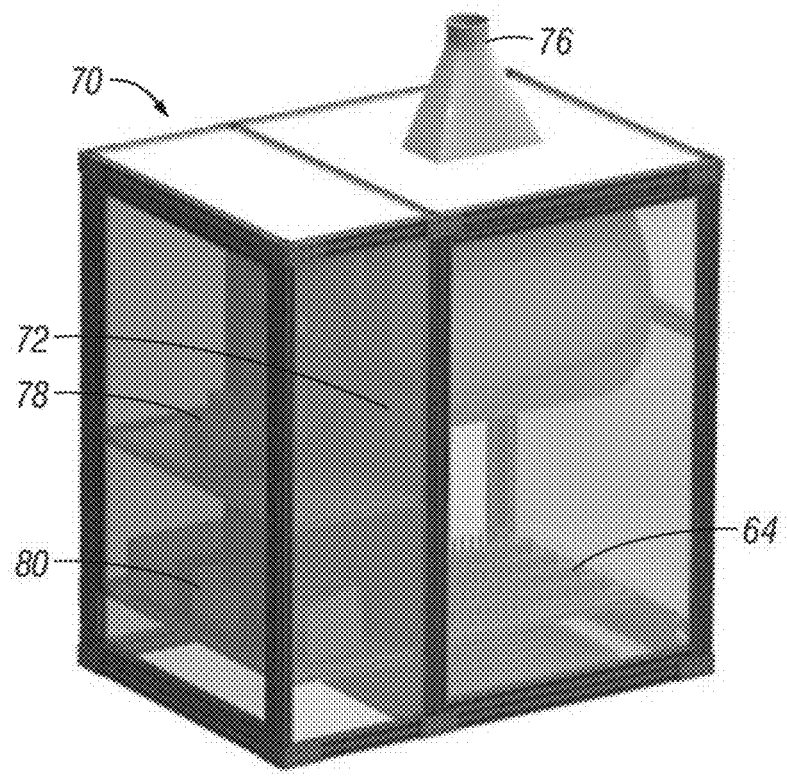
Figure 10A:
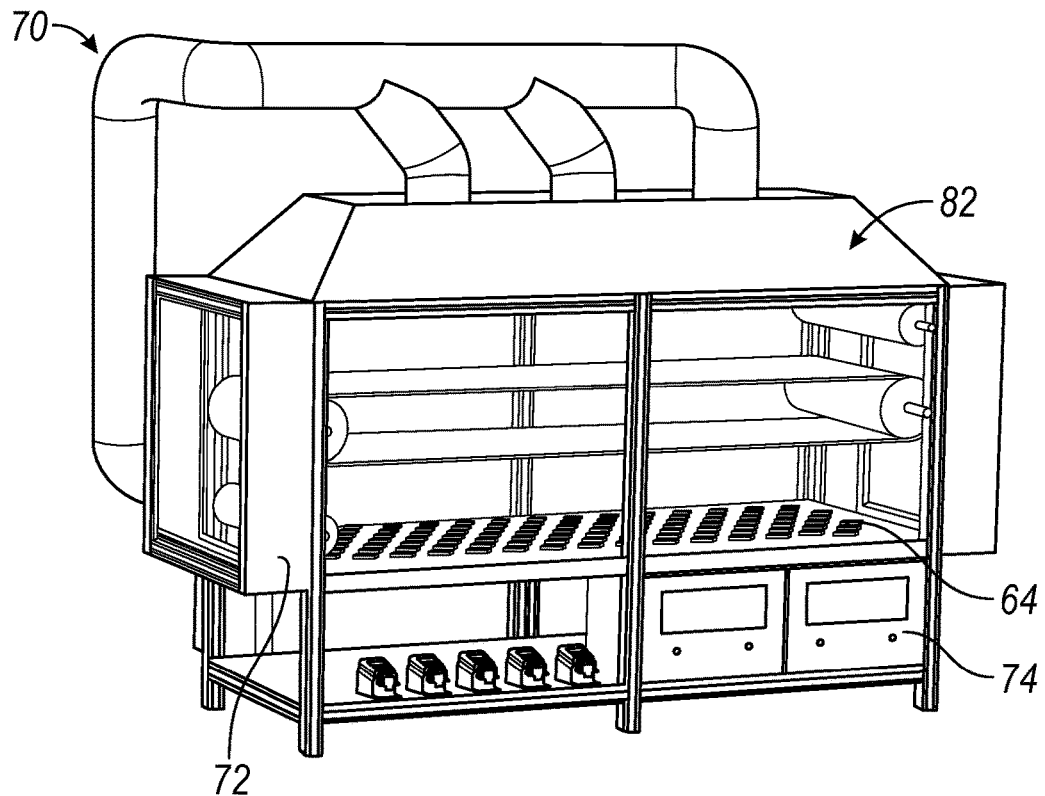
FIG. 10A shows a perspective view of an exemplary electrospinning machine having circular-type spinneret arrays, a continuous feed belt collector, and a cover to capture vapors created from solvents during the electrospinning process.
Figure 10B:
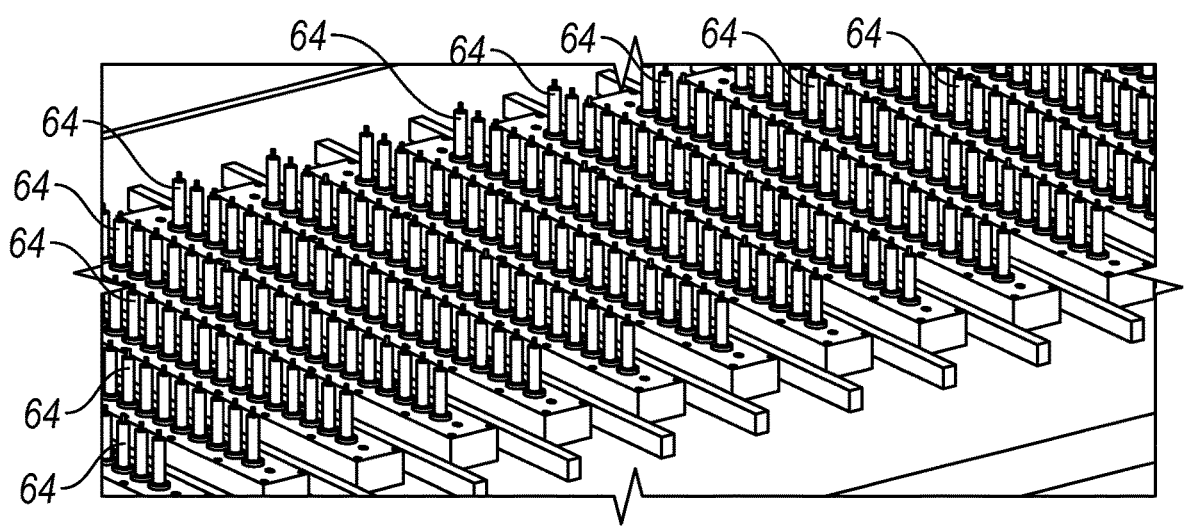
FIG. 10B shows an exemplary system of row-type spinneret arrays that could be substituted with the circular-type arrays in the exemplary electrospinning machine of FIG. 10A.
Figure 11A:
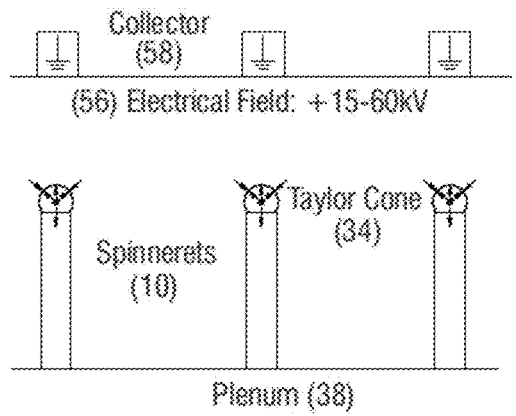
FIGS. 11A-11D provide an exemplary illustration of some of the forces as they relate to the spinneret array.
Figure 11B:
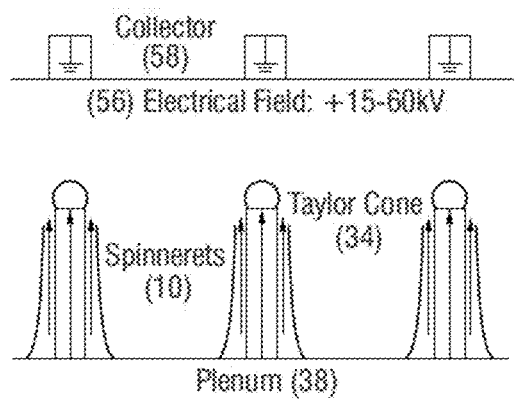
Figure 11C:
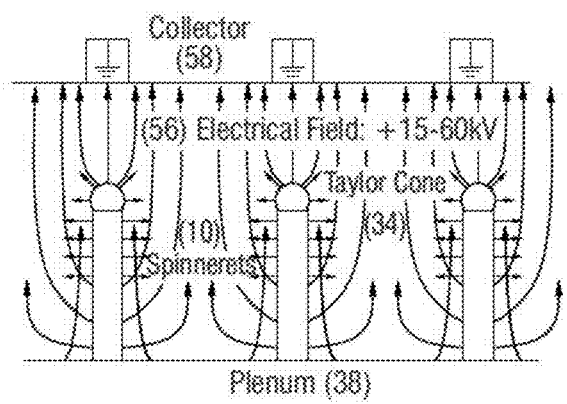
Figure 11D:
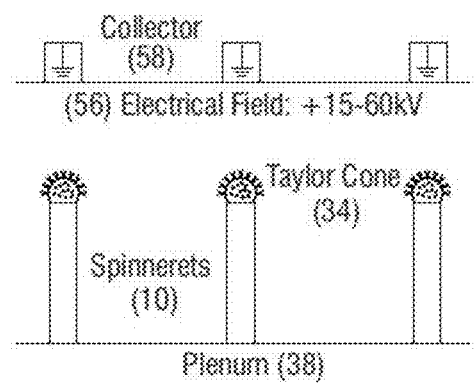

An electrospinning machine 70 can comprise one or more spinneret arrays 64 and/or electrospinning systems 66. An electrospinning machine 70 can be configured in several different ways and can comprise a housing 72, a support structure 74, a venting system 76, an air blowing system 78, a flow control, an energy source 26, a spinneret array 64, a collector 58, a solvent vapor recovery system 82, integrated controls 84, and safety guards 86. Exemplary electrospinning machines 70 are shown in FIGS. 9A-B (having row-type spinneret arrays 64 with a roller as a collector 58) and FIG. 10 (having circular-type spinneret arrays 64 with a continuous feed belt collector 58). According to an aspect of the present disclosure, the electrospinning machine 70 can be configured with a rotating drum, or a conveyor belt type collector system 58 capable of scaling in width and length to accommodate desired thru-put for production. The number of spinnerets 10, arrays 64, vapor control, solvent vapor recovery 82, spin dope pumps and power supplies 26 will be a function of the desired production size of the electrospinning system 66.

The electrospinning machine 70 can also include the spin dope storage and supply 40 component as well as pumps or other mechanisms for feeding the spin dope 18 to the spinneret 10. The collector 58 can optionally be connected to a conveying system such that the nanofibrous mat 90 prepared can be transferred. The electrospinning machine 70 can be controlled via a control system. The control system can be a console that is part of the machine 70 or can be part of a computer system connected via a wired or wireless connection.

Collector

The electrospinning system 66 and machines 70 include an electrically grounded collector 58. The nanofibrous mat collector 58 is dual purpose in that it collects the electrospun nanofibers 88 and acts as the ground bed (anode) for the electrical field 56. The nanofibers 88 formed in the electrical field 56 are gathered at the collector 58 to form nanofibrous mats 90. The collector 58 can be made from any suitable material that can serve as a ground bed for the electrical field 56.

The configuration of the collector 58 may be adjusted to fit the characteristics of the nanofibers 88 being collected and to allow for the most efficient way to process the nanofibrous mat 90, post-electrospinning. For example, suitable configurations include but are not limited to, a continuous-feed roll collector, a disk collector, drum collector, edge collector, grid collector, mandrel collector, and plate collector. The size of the collector 58 can be tailored to be suitable for the size of the ranks and arrays. The collector 58 can rotate or be stationary.

The collector 58 can be located above, below, to the side, or at another position with respect to the spinnerets 10 and spinneret arrays 64. In a preferred embodiment, the collector 58 is above the spinnerets 10.

Standoff Distance

The standoff distance is defined as the distance between the spinneret needle tip 30 and the collector 58. The ideal standoff distance allows proper alignment and drying of the nanofiber 88 created in the electrical field 56 between the spinneret 10 and the collector 58. Within the standoff distance and the coaxial air flow 20, excess solvent is evaporated and the filament 32 becomes attached to the collector substrate 58, and to the other nanofibers 88. The nanofibrous mat 90 is formed when the individual nanofibers 88 produced from the individual spinnerets 10 are collected on the collector substrate 58.

Air Blowing System

The electrospinning machines 70 can comprise an air blowing system 78. An air blowing system 78 can improve the evaporation of solvent and thus formation of the nanofiber 88 on the collector 58. It can also improve the ventilation of solvent vapor by directing the vapor toward the venting system 76. In a preferred embodiment, the air blowing system 78 includes one or more air vents that are positioned between spinneret arrays 64. However, air vents are not limited to positioning between spinneret arrays 64 and can be located in other parts of the electrospinning machine 70.

Housing

The electrospinning machines 70 can include a housing 72 that covers the electrospinning process. This can provide a safety benefit by keeping the solvent vapors within the electrospinning machine 70. Additionally, it provides a safety measure in keeping the charged environment out of physical access. It can benefit in providing a controlled environment for temperature and humidity within the electrospinning machine 70.

Ventilation System

The electrospinning machines 70 can include a ventilation system 76 for evacuating, recovering solvent vapor. In a preferred embodiment, the ventilation system 76 can condense the recovered solvent vapor to form liquid solvent. Preferably, the liquid solvent that has been recovered and condensed can be reused in a subsequent electrospinning process.

Energy System

The electrospinning systems 66 and machines 70 have certain energy parameters suitable for electrospinning processes and the preparation of electrospun nanofibrous mats 90. Thus, an electrospinning machine 70 can include a power supply system 26 or distributed power system. Exemplary power supply systems include, but are not limited to, having between about 35 kV and 100 kV, between about 10W and about 60W, and between about 250 µA and about 750 µA.

Flow Control Method

In the air-assisted spinneret arrays 64, there are two main flows that must be maintained. The primary flow that needs to be maintained is the spin dope flow rate 80. This flowrate 80 is critical to maintaining the proper amount of solution to the needle tip 30 in order for electrospinning to take place. Too little flow 80 and the needle 16 starves. Too much flow 80 and the system wastes spin dope 18 because the system cannot pull fiber 88 at a rate equal to the amount of the solution being supplied. The second flow is the air assist 20 for the spinneret 10. This flow 20 is responsible for improving output flow of spin dope 18 while also controlling the Taylor Vortex and assisting in drying the fiber 88 during the electrospinning process.

Scalability of syringes is possible for supplying spin dope 18, but not at large quantities. Syringes become impractical as production rates are increased. A solution to this is controlled through a pump system. The pump(s) can be scaled to support the size of the machine 70. The pump can be a positive displacement pump or a peristaltic pump. The pulsing of these pump can be mitigated through mechanical adjustments, through accumulators to reduce pressure fluctuation, and by using plenums 38, 42 to buffer the flow the needle 16 sees versus input flow to the system 66.

The flow control method introduces the spin dope 18 into a plenum 38 that supplies the spinneret 10 with an adjustable and accurate amount of spin dope 18. This is affected by several forces, including physical, mechanical, electrical and chemical forces. Physical forces, include, but are not limited to, air currents, gravity, humidity, temperature, pressure, distance, and viscosity. Mechanical forces include, but are not limited to, fluid flow control 80 and air assist 20. Electrical forces include, but are not limited to, potential energy, static field vector direction, repulsive forces, and dielectric constant. Chemical include, but are not limited to, surface tension and polarity of the solution. The spin dope 18 is delivered to the plenum 38 using a peristaltic pump. FIGS. 11A-11D provide an exemplary illustration of some of these forces as they relate to the spinneret array 64. By controlling the spin dope flow 80 and air-assist flow 20 some of these forces can be controlled and tailored to optimize conditions for electrospinning.

Control System

The electrospinning systems 66 and machines 70 can include an integrated control system 84 (not shown) to control the various parameters of the electrospinning process. Non-limiting examples include control of the venting system 76, air blowing system 78, safety controls, energy system 26, collector 58, spinnerets 10, spinneret arrays 64, selection of spin dope 18, control of an air-assisted spinneret array 64, control of a liquid-assisted spinneret array, the flow control mechanisms 80, etc. The integrated control system 84 can be configured to operate on a wired or wireless computer or network, portable devices, etc.

Methods of Use

Air Assisted Spinnerets

Figure 12:
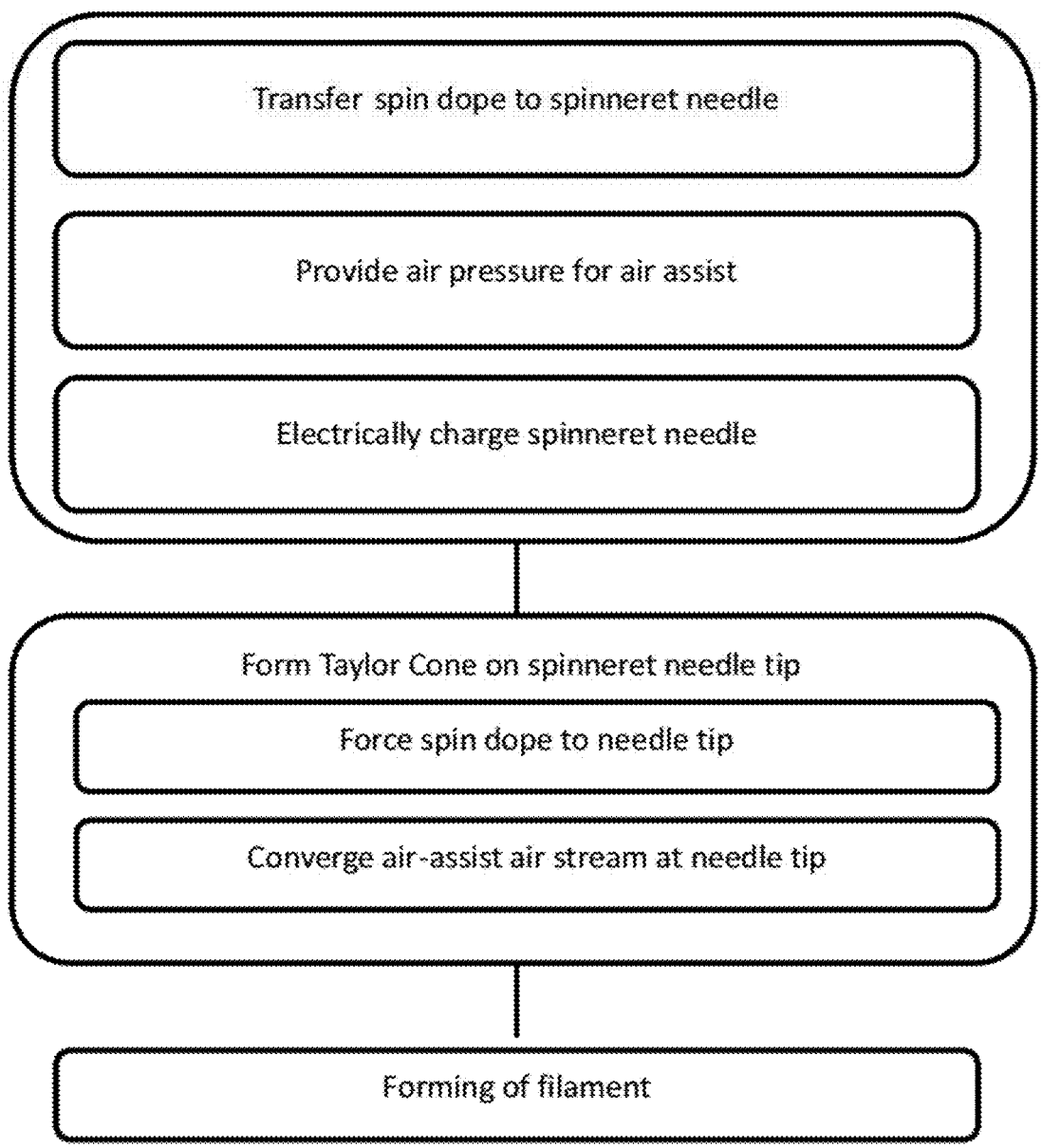
FIG. 12 shows a flow chart of an exemplary method using the air assisted spinnerets to form a nanofiber and/or nanofibrous mat.

An exemplary method of using the air assisted spinnerets 10 is shown in FIG. 12. The method includes transferring the spin dope 18 to the spinneret needle 16, providing air pressure for the air assist 20, and electrically charging the spinneret needle 16. These can commence simultaneously or not. Next the Taylor Cone 34 is formed on the spinneret needle tip 30 by forcing the spin dope 18 from within the spinneret needle 16 to the needle tip 30 and by converging the air-assist air stream 20 at the needle tip 30. The last step includes forming a filament 32. This can be aided by the air assist 20, which can help propel the filament 32 from the needle tip 30, assist in lowering the surface tension of the Taylor Cone 34, and assist in evaporation of the solvent vapor from the spin dope 18.

The filament 32 can be collected on a collector 58 to prepare an electrospun nanofibrous mat 90 or electrospun nanofiber 88.

Electrospinning Machine Comprising a Spinneret Array

Figure 13:
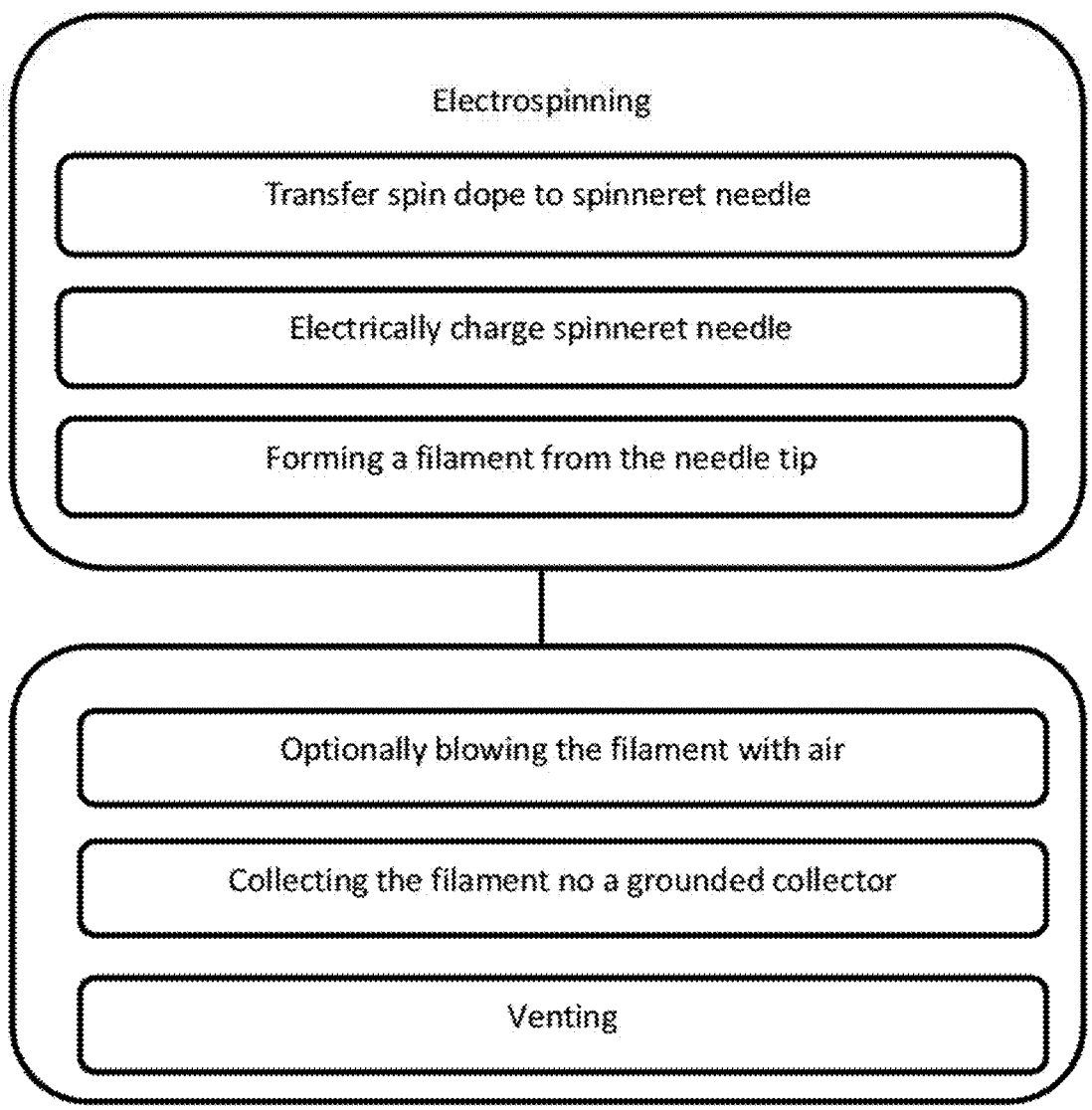
FIG. 13 shows a flow chart showing an exemplary method of preparing a nanofibrous mat in an electrospinning machine comprised of the spinneret arrays.

An exemplary method of using an electrospinning machine 70 comprising a spinneret array 64 is shown in FIG. 13. An electrospinning machine 70 comprising one or more spinneret arrays 64 can be used to prepare an electrospun nanofibrous mat 90. Electrospinning by transferring spin dope 18 to a plurality of spinnerets 10 in one or more spinneret arrays 64; wherein the spinnerets 10 are spaced apart such that the ratio of non-adjacent spinneret needles 16 to adjacent spinneret needles 16 is between about 3:1 and about 4:1; electrically charging the spinneret needles 16; forming a filament 32 from the Taylor Cone 34; optionally blowing the filament 32 with air to assist 20 with evaporation of the solvent vapor and formation of the nanofiber 88; collecting the filament 32 on a grounded collector 58; and optionally venting the solvent vapor.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Development of the Spinneret Array and Electrical Field Design

The spinneret configuration was explored to determine preferred configuration for spinneret arrays that produced the desired electrical field and were capable of electrospinning both neat polymer nanofibers and blended polymer nanofibers. As discussed above, production of an electrical field through a spinneret array that has a properly developed electromagnetic field with minimal disturbances is necessary to achieve scalable electrospinning in a spinneret array configuration. Further, the ability to utilize multiple spinnerets in an electrospinning system and/or machine, is desirable for larger scale production. Thus, production of an electrical field among multipe spinneret arrays where each array retains a properly developed electromagnetic field and where disturbances among spinneret arrays is limited. Various spinneret array configurations were examined to determine suitable and preferred spinneret array configurations.

The multiple spinneret (spinneret array) electrospinning technique has been explored to produce neat and blended nanofibers, and those nanofibers have been collected into nanofibrous mats. An innovative spinneret array is described along with methods for manufacturing multiple spinneret electrospinning equipment and methods of using the same.

The original spinneret consisted of one 18-gauge spinneret needle, supplied by a single 30-ml plastic syringe. The syringe was filled with spin dope and placed in a programmable syringe pump to control the spin dope's flow rate. An electrical field was established by using a programmable power supply, with the needle as the positive side and the collector as the ground.

The original collector was a one-foot diameter drum covered in aluminum foil. As a droplet (referred to as the Taylor Cone) formed at the tip of the needle, the droplet was drawn very rapidly from the needle to the collector, forming fibers of nanometer range. The syringe pump was mounted on a transverse slide, allowing the pump to move laterally across the roller to uniformly distribute the spray from the needle. The fibers were collected on the rotating roller randomly as a nanofibrous mat.

The described mechanism, with all its motors and controllers, was incorporated into the first production machine. With further refinement, the system evolved to include two spinnerets on one side of the roller and one spinneret on the opposite side of the roller. While this machine was quite adequate to meet limited research needs, the equipment proved to be inadequate for industrial scale research, development, and production. A new type of spinneret with a radically new delivery system was required.

The combination of the spinneret array and the spin dope delivery plenum allows an increased flow rate and the ability to control flow rate to each spinneret in each array. Thus, the flow rate to each spinneret can be adjusted to accommodate the formulation of spin dope or blend that is being supplied to the spinnerets. In some embodiments, it is preferable for the flow rate to be substantially similar if not identical at each spinneret. For example, a 1 ml/hr flow rate at a single needle results in an actual flow rate of 21 ml/hr across a rank of 21 needles; an increase of 0.5 ml/hr results in an actual flow rate of 31.5 ml/hr.

Difficulties that arose during the development of the electrospinning machine sub-systems were mainly focused around the electrical field and the patterns in which the arrays were designed and uniform flow rates across the system. Other factors that related to the physical, mechanical, electrical and chemical properties of the system were investigated to identify which factors had the greatest impact on the overall performance, but none of those contributing factors seemed to impact the performance more than the generation stable electrical field and uniform flow rates across all needles. Needle-to-needle spacing and array-to-array spacing were identified to be the major contributors the success and failure of a scaled-up electrospinning machine. Using 2-D simulations and testing results to validate the tool, a ratio was identified between the needle-to-needle and the array-to-array spacing for proper operation. The ratio identified was between about 3:1 and about 4:1 ratio between the distance the arrays are placed when compared to the needle-to-needle spacing. It was observed that placing the arrays closer than a 3:1 ratio seemed to introduce electrical field effects. The ratio of 4:1 was found to be most preferable. These effects on the performance of the arrays were intensified as more array were placed into the system. The inverse was observed if the arrays were spaced greater than the 4:1 ratio. As the distance between the arrays grew, the electrical affects had less of an impact between the arrays. The key element in the spacing is understanding the relationship between the needle-to-needle spacing as compared to the array-to-array spacing. The denser this relationship can be, the more product can be made in set time interval.

Various spinneret ranks were prepared and tested using an electrostatic modeling program and experimentation to determine suitable configurations for the spinneret ranks and arrays. It was found that the majority of spinneret configurations considered did not work due to interference in the electromagnetic field.

FIGS. 6A-D and FIGS. 14A-14F show exemplary configurations of spinnerets considered and their resultant electromagnetic fields. It was found that a row-type configuration provided the best electromagnetic field, as shown in FIGS. 6A-D. The proper electromagnetic field for this configuration can be seen in FIG. 6D, which shows electromagnetic field having minimal disturbance and electromagnetic field lines in a substantially parallel elliptical shape. The configurations of FIGS. 14A-E did not provide an electric field suitable for electrospinning, which is evidenced in the electromagnetic fields which were not properly developed like that of FIG. 6D. The electromagnetic field produced by the circular array configuration in FIG. 14F was not as good as that of FIGS. 6A-D; however, it could be improved with changes in the spacing between spinneret needles and modification of the energy in the field to achieve a workable spinneret array for larger scale production.

FIG. 8 shows an electrical field produced by three row-type spinneret array configurations having a ratio of spinneret arrays to adjacent spinneret needles of about 4:1. It was found that a properly developed electrical field could be retained for each spinneret array and the electrical field produced by the system was suitable for electrospinning using the ratio of about 3:1 to about 4:1. It was found that a 4:1 ratio was most preferred having the least disturbance in the system from the adjacent electrical fields produced by the individual spinneret arrays.

Thus, it was determined that with proper spacing of the needles/spinnerets, improved performance can be achieved and the electrical field issues can be managed. The array spacing impacts the performance of the systems more than the space between the needles. This interference between arrays impacts the performance of the larger array.

Example 2

Preparation of Neat PAN Nanofibers and CA/PEO Blend Nanofibers with an Air-Assisted Spinneret The air-assisted electrospinning technique was used to prepare the neat nanofibers of polyacrylonitrile (PAN) and the blend nanofibers of cellulose acetate (CA) and polyethylene oxide (PEO). The effects of coaxial air flow on the stability of electrospinning process and on the morphology of polymer nanofibers were systematically investigated. This example was performed in two stages, the first stage was an exploratory experiment to study the effect of coaxial air flow on the electrospinning process, in which the optimal air flow conditions were determined; while the second stage was to investigate the air-assisted electrospinning technique for the preparation of two types of polymer nanofibers, i.e., neat nanofibers (PAN) and blend nanofibers (CA/PEO). This demonstrated that both neat and blend nanofibers can be prepared. These polymer examples are exemplary only and non-limiting.

Two types of spinning solutions were prepared (i.e., PAN and CA/PEO solutions). For making the solutions of neat PAN (Mw~150,000), different amounts of PAN were dissolved in dimethylformamide (DMF) to prepare three solutions with the concentrations being 8, 10, and 12 wt. %, respectively. For making the solutions of CA/PEO blend, the predetermined amounts of CA (Mn~30,000, 39.8 wt. % acetyl content), PEO (Mn~400,000), and diethyl amino ethyl chloride (DAEC) were dissolved in the mixture solvent of $CHCl_3$/DMF (with weight ratio of 1/1); more specifically, the respective concentrations of PEO and DAEC were 1.5 wt. % and 0.1 wt. %, while the concentrations of CA (in four solutions) were 4.5, 5.0, 5.5, and 6.0 wt. %, respectively.

Prior to the electrospinning, the 8.0 wt. % PAN/DMF solution was loaded into a 30 mL Luer-Lok™ tip plastic syringe connecting to the core section of air-assisted spinneret as shown in FIGS. 5A and 5B. The air-assisted electrospinning setup included a high voltage power supply (Gamma High Voltage Research, Inc., Ormond Beach, Fla.), a pressure air supply, and a laboratory-produced roller with the diameter of 10 inches. During the electrospinning, a positive high voltage of 18 kV was applied to the needle, which was placed 20 inches away from the electrically grounded collector covered with aluminum foil; and an inflow rate of 3.0 mL·h$^{-1}$ was maintained by using a digitally controlled syringe pump (KD Scientific Inc., Holliston, Mass.). Various air pressures (i.e., 0, 1, 2, 3, and 5 psi) were investigated to understand the effect of air pressure on the electrospinning process; 3 psi was determined as the optimal air pressure, and it was adopted for the following studies.

Three neat PAN solutions was prepared and loaded into a 30 mL Luer-Lok™ tip plastic syringe connecting to the core section of air-assisted spinneret as shown in FIGS. 5A and 5B. Thereafter, a positive high voltage of 18 kV was applied to the needle that was 20 inches away from the electrically grounded collector covered with aluminum foil, an inflow rate of 3.0 mL·h$^{-1}$ was maintained by using a digitally controlled syringe pump (KD Scientific Inc., Holliston, Mass.), and an air pressure of 3 psi was applied to the air-assisted electrospinning system. For preparing CA/PEO blend nanofibers, each of the four CA/PEO solutions was loaded into a 30 mL Luer-Lok™ tip plastic syringe connecting to the core section of air-assisted spinneret. During the electrospinning, a positive high voltage of 15 kV was applied to the needle that was 20 inches away from the electrically grounded collector covered with aluminum foil, an inflow rate of 3.0 mL·h$^{-1}$ was maintained by using a digitally controlled syringe pump, and an air pressure of 3 psi was applied to the air-assisted electrospinning system.

Figure 15:
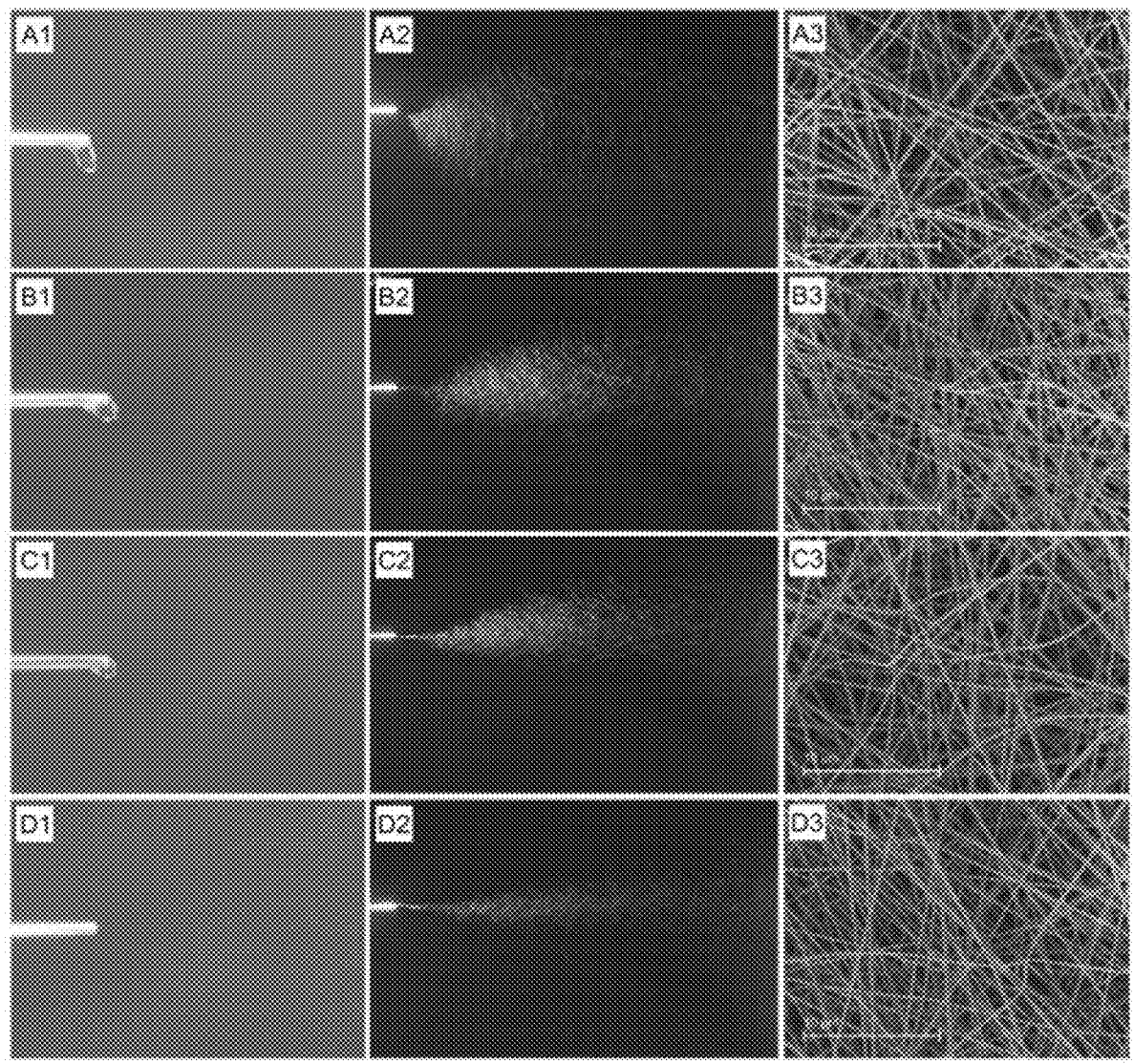
FIG. 15 shows representative photos of solution droplets at the tip of spinneret (left column), the flying patterns of electrospinning jets/filaments (middle column), and the SEM images of PAN nanofibers (right column) under the air-blowing pressures at 0 psi (A1-A3), 1 psi (B1-B3), 2 psi (C1-C3), and 3 psi (D1-D3), respectively.

The effects of air pressure on the air-assisted electrospinning process and on the resulting PAN nanofibers are demonstrated in FIG. 8. It was found that with the coaxial air flow, a solution droplet on the spinneret tip was generally easier to form a filament; and the air flow also facilitated the continuing and stable electrospinning process, resulting in the uniformly high quality nanofibers. If the air flow was too strong (e.g., when the highest air pressure of 5 psi was applied), the solution droplet might occasionally be blown to the collector directly without formation of jet/filament (using visual observation). As shown in FIG. 15, under different air blowing pressures (i.e., 0, 1, 2, and 3 psi), the prepared PAN nanofibrous membranes always consisted of randomly overlaid nanofibers with similar diameters of ~200 nm. These nanofibers had a uniform morphology without microscopically identifiable beads and/or beaded-nanofibers.

It is important to note that the air-assisted electrospinning technique possesses two advantageous features. First, increased the nanofiber productivity and electrospinning process stability. Second, the direction of electrospinning jet was controlled better to improve the collection efficiency.

Conventional electrospinning techniques are based on applying the electrostatic charges to a filament to produce nanofibers without any additional forces, and the production rate of electrospinning is determined by the outflow rate of solution at the spinneret. The spinnerets described herein have the ability to improve the electrospinning process productivity rates and stability with the air assisted technique that results from the design of the spinnerets. For example, looking at FIG. 3A1, when the inflow rate was 3.0 mL·h$^{-1}$ and air pressure was 0 psi (i.e., without coaxial air flow, like a conventional electrospinning process), the 8 wt. % PAN solution could not be completely controlled by the electric force alone and, the solution droplet formed and grew larger at the spinneret tip. When air pressure was gradually increased to 3 psi and applied to the electrospinning filament, the formation of solution droplet at the spinneret tip was distinguishably reduced (even eventually prevented), as shown in FIGS. 15A1-15D1.

For the 8 wt. % PAN solution, the maximum outflow rate was approximately 1.0 mL·h$^{-1}$ by using the conventional electrospinning setup. The solution droplet started to form and then drip off from the spinneret tip when the inflow rate was larger than 1.0 mL·h$^{-1}$ (FIG. 15A1). With the coaxial air flow at a pressure at 3 psi, the outflow rate could readily reach 3.0 mL·h$^{-1}$ without any identifiable buildup of solution droplet at the spinneret tip (FIG. 15D1). The air-assisted electrospinning technique effectively increases the nanofiber productivity rates and process stability, and the resulting nanofibers would be morphologically uniform.

The direction of electrospinning jet could be controlled better with the use of the air assisted technique. Coaxial air also improved the collection efficiency. FIGS. 15A2-15D2 show that by increasing the air pressure from 0 to 3 psi, the electrospinning jet/filament was pulled from the solution by the joint action of electric force and air flow; and the corresponding fly patterns of filament became less and less scattered. The distance between the spinneret tip and the collector surface was set at 20 inches; without the coaxial air flow (as shown in FIG. 15A2), the fly pattern of electrospinning jet was considerably more scattered and some PAN nanofibers could not be collected. With coaxial air flows (as shown in FIG. 15B2-15D2), the fly patterns of electrospinning jet became much narrower; and almost all of the PAN nanofibers could be efficiently collected on the electrically grounded aluminum collector 20 inches away. In many reported research activities, the distance between the spinneret tip and the collector surface was set around 10 inches (half the distance tested here). A longer tip-collector distance benefits the solvent evaporation during the electrospinning process.

Figure 16:
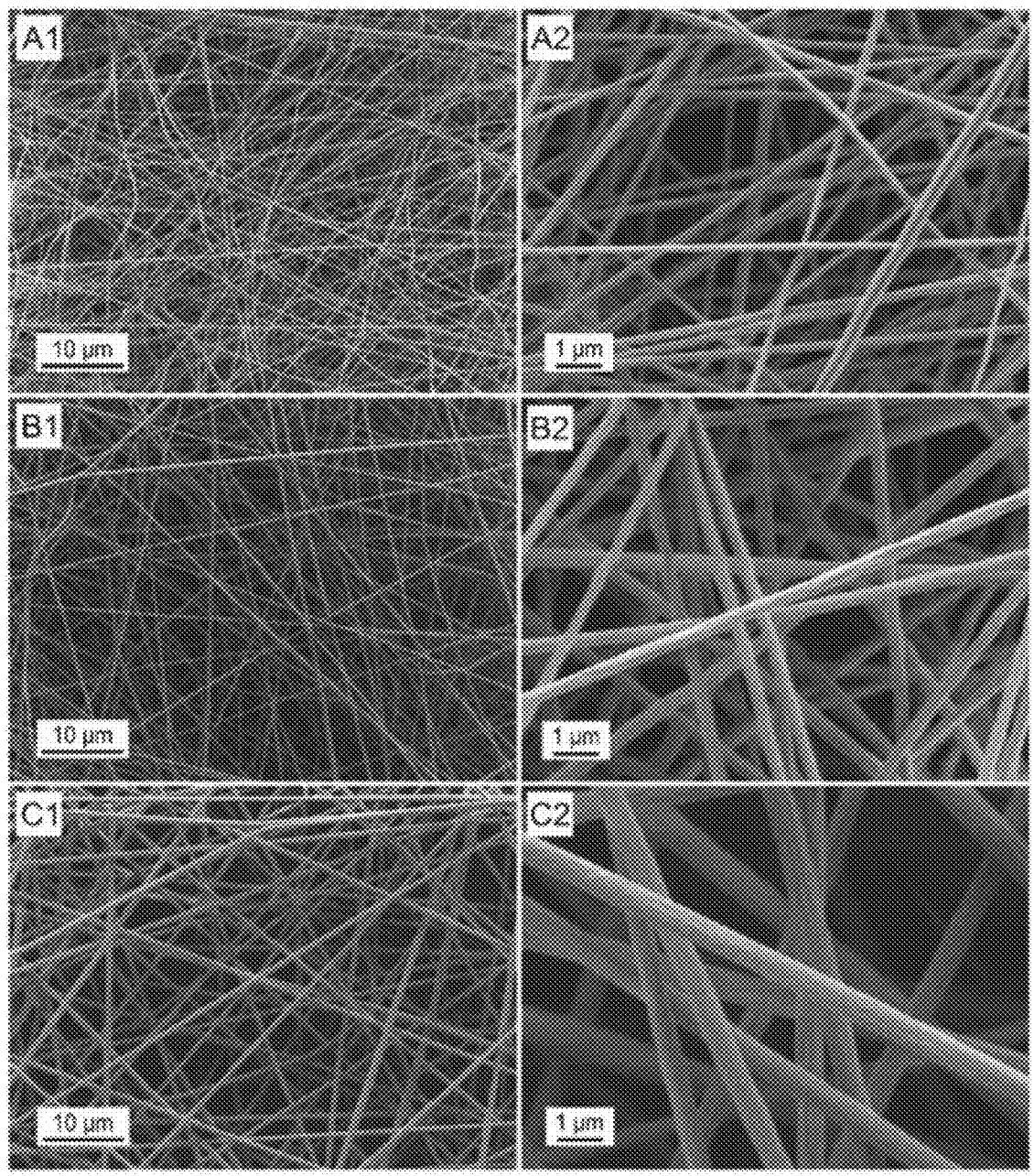
FIG. 16 shows SEM images showing the representative morphologies of neat PAN nanofibers electrospun from the solutions with PAN concentrations being 8 wt. % (A1 and A2), 10 wt. % (B1 and B2), and 12 wt. % (C1 and C2), respectively. Images in the left column showing the nanofibers with low magnification, while images in the right column showing the corresponding nanofibers with high magnification.

The neat PAN nanofibers shown in FIG. 16 in scanning electron microscope (SEM) images demonstrate that the air-assisted electrospun neat PAN nanofibers had a cylindrical shape without microscopically identifiable beads and/or beaded-nanofibers. The neat PAN solutions with concentrations of about 8, 10, and 12 wt. % resulted in nanofiber diameters of approximately 200, 350, and 550 nm, respectively. It was found that the air-assisted electrospinning technique was able to continuously and stably prepare neat PAN nanofibers from the solutions with different concentrations. The nanofiber diameters became larger as the PAN concentration increased.

Figure 17:
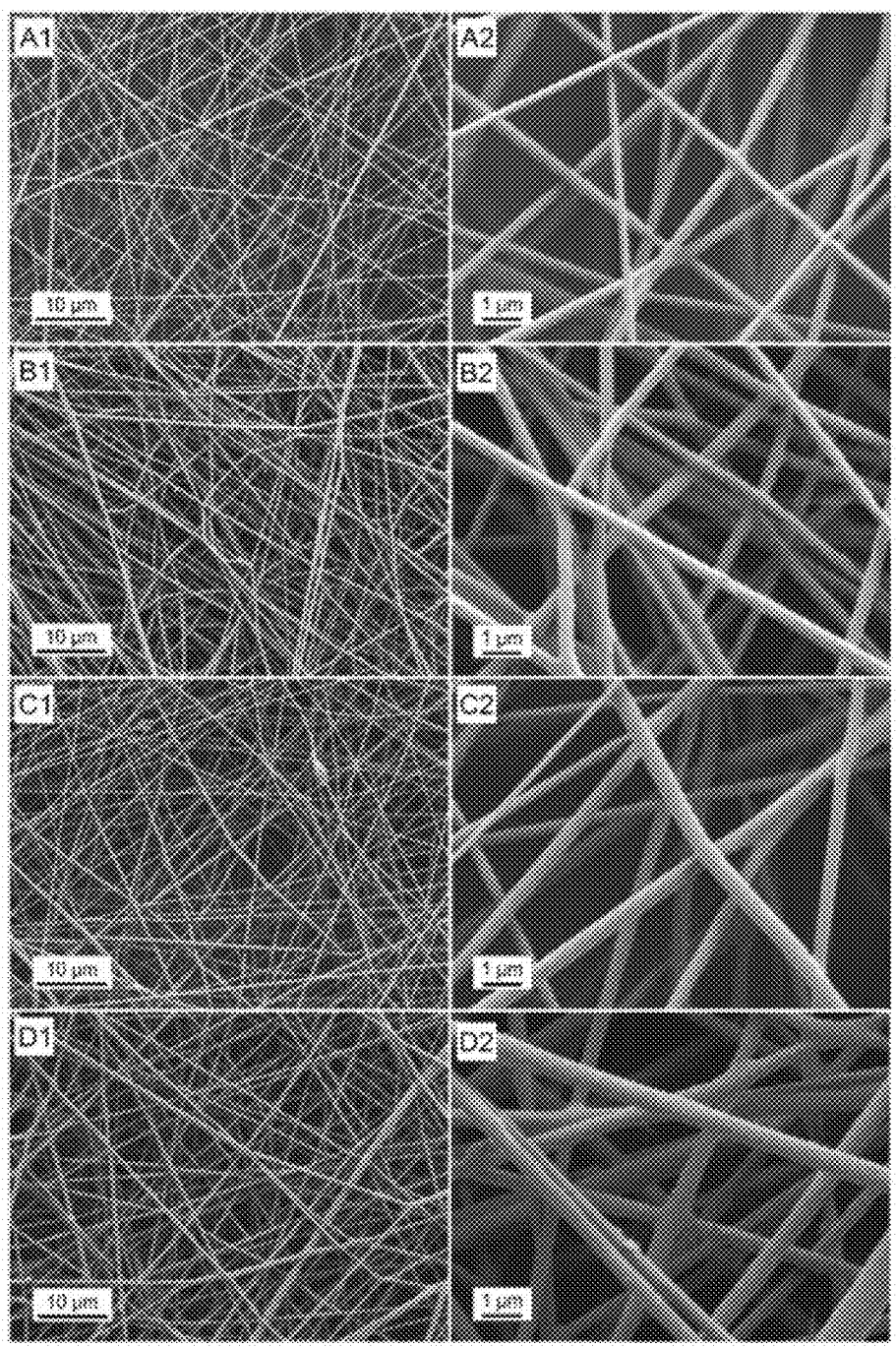
FIG. 17 shows SEM images showing the representative morphologies of CA/PEO blend nanofibers electrospun from the solutions with CA/PEO weight ratios being 4.5/1.5 (A1 and A2), 5.0/1.5 (B1 and B2), 5.5/1.5 (C1 and C2), and 6.0/1.5 (D1 and D2), respectively. Images on the left showing the nanofibers with low magnification, while images on the right showing the corresponding nanofibers with high magnification.

The neat CA/PEO blend nanofibers are shown in FIG. 17 as SEM images. As shown in FIG. 17, the air-assisted electrospun CA/PEO blend nanofibers also had a cylindrical shape without microscopically identifiable beads and/or beaded-nanofibers. With the CA concentrations in solutions being 4.5, 5.0, 5.5, and 6.0 wt. %, the resulting CA/PEO blend nanofibers had the diameters of ~250, ~350, ~450, nm, and ~500 nm, respectively. The air-assisted electrospinning technique was also able to continuously and stably prepare CA/PEO blend nanofibers from different solutions.

The results of this Example demonstrate (1) that the introduction of coaxial air flow surrounding the electrospinning spinneret could supplement the electrostatic repulsive forces; (2) the combination of electric force and coaxial air flow increased the (maximum) outflow rate; (3) the coaxial air flow improved the stability of electrospinning process by maintaining constant shape of the Taylor Cone; (4) the air flow facilitated the rapid dissipation/removal of solvent vapor, thus preventing the collected nanofiber mat to form as a film.

What is claimed is:

1. An air-assisted electrospinning spinneret comprising:
a spinneret needle, wherein the spinneret needle is electrically conductive and comprises a tip;
an enclosure, wherein the enclosure has a nozzle that the spinneret needle passes through;
a spin dope plenum; wherein the spin dope plenum is housed within the enclosure, and wherein the spinneret needle is in fluid communication with the plenum; and
a plurality of air holes in the nozzle, wherein each air hole defines an air path converging at the spinneret needle tip.

2. The spinneret of claim 1, wherein the needle is made of a metal.

3. The spinneret of claim 1, wherein the spinneret needle further comprises an outer sleeve that forms a channel.

4. The spinneret of claim 3, wherein the channel is in fluid communication with a spin dope plenum or a spin dope reservoir.

5. The spinneret of claim 1, wherein the plurality of air holes is between 4 and 12 air holes.

6. The spinneret of claim 1, wherein there are an even number of air holes.

7. The spinneret of claim 1, wherein the spinneret needle has an inner diameter between about 0.4 mm and about 1.5 mm.

8. The spinneret of claim 1, wherein the spinneret needle is between about 0.5 inches in length and about 10 inches in length.

9. The spinneret of claim 1, wherein the spinneret needle extends beyond the enclosure a distance of between about 0.2 inches and about 4 inches.

10. A spinneret array comprising:
two or more air-assisted electrospinning spinnerets of claim 1, wherein the spinneret needles are separated to form a distance between the spinneret needles, and wherein the spinneret needles form a row or a circle.

11. The spinneret array of claim 10, wherein there are six or more spinnerets and the spinnerets are circularly arranged, or wherein the two or more spinnerets are in a row.

12. The spinneret array of claim 11, wherein the spinnerets are in a row, and wherein the row comprises between 3 spinnerets and 1000 spinnerets.

13. The spinneret array of claim 10, wherein the spinneret array when electrically charged produces a stable electrical field, and wherein the spinneret needles are spaced apart in a ratio of the non-adjacent spinneret needles to adjacent spinneret needles of between about 3:1 and about 4:1.

14. A method of preparing an electrospun nanofibrous mat with a spinneret of claim 1 comprising:
transferring a spin dope to the spinneret needle;
providing air pressure for an air-assist;
electrically charging the spinneret needle;
forcing the spin dope from within the spinneret needle to the needle tip and converging an air stream at the needle tip from the air-assist to form a Taylor Cone on the spinneret needle tip;
forming a filament from the Taylor Cone; and
collecting the filament on a collector.

15. The method of claim 14, wherein the spinneret needle further comprises an outer sleeve that forms a channel, and wherein the channel is in fluid communication with a spin dope plenum or a spin dope reservoir.

16. The method of claim 14, wherein there are an even number of air holes.

17. The method of claim 14, further comprising blowing the filament.

18. The method of claim 14, further comprising venting solvent vapor from the filament.

* * * * *